United States Patent
Ren

(10) Patent No.: US 11,250,089 B2
(45) Date of Patent: Feb. 15, 2022

(54) METHOD FOR DISPLAYING SERVICE OBJECT AND PROCESSING MAP DATA, CLIENT AND SERVER

(71) Applicant: Alibaba Group Holding Limited, Grand Cayman (KY)

(72) Inventor: Siyu Ren, Zhejiang (CN)

(73) Assignee: Alibaba Group Holding Limited, George Town (KY)

( * ) Notice: Subject to any disclaimer, the term of this patent is extended or adjusted under 35 U.S.C. 154(b) by 394 days.

(21) Appl. No.: 16/513,426

(22) Filed: Jul. 16, 2019

(65) Prior Publication Data
US 2020/0012702 A1    Jan. 9, 2020

Related U.S. Application Data

(63) Continuation of application No. PCT/CN2018/071528, filed on Jan. 5, 2018.

(30) Foreign Application Priority Data

Jan. 18, 2017 (CN) .......................... 201710033436.4

(51) Int. Cl.
*G06F 15/16* (2006.01)
*G06F 16/9537* (2019.01)
(Continued)

(52) U.S. Cl.
CPC ........ *G06F 16/9537* (2019.01); *H04W 4/185* (2013.01)

(58) Field of Classification Search
USPC ..................................... 715/768, 234, 501.1
See application file for complete search history.

(56) References Cited

U.S. PATENT DOCUMENTS 7,542,943 B2 * 6/2009 Caplan ................ G07F 17/0014
705/35
8,972,177 B2 * 3/2015 Zheng ................ H04N 21/4126
701/454
(Continued)

FOREIGN PATENT DOCUMENTS

| CN | 103377204 A | 10/2013 |
| CN | 103852080 A | 6/2014 |
| CN | 104657416 A | 5/2015 |

OTHER PUBLICATIONS

Translation of Written Opinion for corresponding PCT Application PCT/CN2018/071528, dated Jul. 26, 2019, a counterpart foreign application for U.S. Appl. No. 16/513,426, 4 pages.
(Continued)

*Primary Examiner* — Jude Jean Gilles
(74) *Attorney, Agent, or Firm* — Lee & Hayes, P.C.

(57) ABSTRACT

A method for displaying a service object, a method for processing map data, a client, and a server are disclosed by the embodiments of the present disclosure. The method for displaying the service object includes: providing a filtering interface, wherein the filtering interface comprises a map display area and a dimension-divided display area, the dimension-divided display area displays at least one divided dimension and description information corresponding to a plurality of sub-dimensions, a map of a target city is displayed in the map display area, and the map of the target city displays regional scopes corresponding to the plurality of sub-dimensions; receiving information of a divided dimension and a sub-dimension selected by a user; and displaying a service object associated with the sub-dimension selected by the user according to an association relationship between the service object and the sub-dimension. The methods can provide more rich filtering information to a user.

20 Claims, 11 Drawing Sheets

(51) Int. Cl.
*H04W 4/18* (2009.01)
*G06F 3/12* (2006.01)

(56) References Cited

U.S. PATENT DOCUMENTS

| | | |
|---|---|---|
| 9,141,640 B2 | 9/2015 | Tadman et al. |
| 9,429,435 B2 | 8/2016 | Blumenberg et al. |
| 10,453,226 B1 | 10/2019 | Burrows et al. |
| 11,105,647 B2 * | 8/2021 | Fukumori .......... G01C 21/3682 |
| 2002/0070981 A1 | 6/2002 | Kida |
| 2005/0027705 A1 | 2/2005 | Sadri et al. |
| 2006/0041556 A1 * | 2/2006 | Taniguchi ............ G08G 1/0962 |
| 2007/0038950 A1 * | 2/2007 | Taniguchi ............. H04W 4/021 |
| | | 715/768 |
| 2009/0210388 A1 | 8/2009 | Elson et al. |
| 2010/0073714 A1 * | 3/2010 | Mochizuki ............ G06F 3/1224 |
| | | 358/1.15 |
| 2012/0221595 A1 | 8/2012 | Slowe et al. |
| 2013/0031506 A1 | 1/2013 | Diaz et al. |
| 2014/0310655 A1 | 10/2014 | Sims |
| 2015/0038161 A1 | 2/2015 | Jakobson et al. |
| 2015/0073941 A1 | 3/2015 | Burrows et al. |
| 2017/0206211 A1 | 7/2017 | Kreitler et al. |
| 2018/0067953 A1 | 3/2018 | Stallman |

OTHER PUBLICATIONS

Translation of Written Opinion for corresponding PCT Application PCT/CN2018/071528, dated Jul. 18, 2019, a counterpart foreign application for U.S. Appl. No. 16/513,426 , 4 pages.

* cited by examiner

METHOD FOR DISPLAYING SERVICE OBJECT AND PROCESSING MAP DATA, CLIENT AND SERVER

CROSS REFERENCE TO RELATED PATENT APPLICATIONS

This application claims priority to and is a continuation of PCT Patent Application No. PCT/CN2018/071528 filed on 5 Jan. 2018, and is related to and claims priority to Chinese Patent Application No. 201710033436.4, filed on 18 Jan. 2017 and entitled "Method for Displaying Service Object and Processing Map Data, Client and Server," which are hereby incorporated by reference in their entirety.

TECHNICAL FIELD

The present disclosure relates to the field of computer technologies, and particularly to methods for displaying service object and processing map data, clients and servers.

BACKGROUND

With the continuous development of intelligent terminals, applications running on smart terminals are constantly improved. Currently, users can perform various operations, such as instant messaging, map navigation, mail checking, and hotel reservation, etc., through the applications running on the smart terminals.

Currently, an application that can implement a hotel reservation function can generally display various search information that satisfies filtering conditions selected by a user according to the filtering conditions. For example, the user can enter hotel check-in and departure dates in the application, and select a desired place to stay. Referring to FIG. 1, the application can provide the user with filtering labels, such as a star price, a hotel location, etc. When the user clicks on a filtering label associated with hotel location, a corresponding filtering floating window can appear on a current page. In the filtering floating window, a collection of individual geographical regions, for example, business districts, administrative regions, subway lines, etc, can be demarcated. When the user selects at least one sub-dimension of the collection of geographical regions and clicks for confirmation, the application can display search information that matches the at least one sub-dimension to the user.

As can be seen from above, currently, an application usually presents only names indicating geographical regions to a user when a hotel reservation is performed. If the user is unfamiliar with the destination, it is often impossible to know exactly where a selected geographical region is. In this case, the user needs to switch to a map application to conduct a location query or needs to check an actual location of a hotel on a map in the hotel's details page. As can be seen, filtering information provided by current applications to users is too single, and fails to fulfill actual needs of the users.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Embodiments of the present disclosure aim to provide a method for displaying a service object and processing map data, a client, and a server, which can provide richer filtering information to a user to reduce operations of the user.

In implementations, the present disclosure provides a method for displaying a service object, which is provided with a database. The database stores an association relationship between service objects and at least one sub-dimension of different divided dimensions. The method includes: providing a filtering interface, the filtering interface including a map display area and a dimension-divided display area, and the dimension-divided display area displaying at least one divided dimension and description information corresponding to a plurality of sub-dimensions; displaying a map of a target city in the map display area, the map of the target city displaying regional scopes corresponding to the plurality of sub-dimensions; receiving information of a divided dimension and a sub-dimension selected by a user; and displaying a service object associated with the sub-dimension selected by the user according to an association relationship between the service object and the sub-dimension.

In implementations, the present disclosure further provides a client. The client includes a memory, a processor, and a display, wherein: the memory is configured to provide a database and store a computer program executable by the processor; the database stores an association relationship between service objects and at least one sub-dimension of different divided dimensions; the display is configured to display page information; and the processor is configured to implement, when the computer program is executed, the following operation: providing a filtering interface through the display, the filtering interface including a map display area and a dimension-divided display area, and the dimension-divided display area displaying at least one divided dimension and description information corresponding to a plurality of sub-dimensions; displaying a map of a target city in the map display area, the map of the target city displaying regional scopes corresponding to the plurality of sub-dimensions; receiving information of a divided dimension and a sub-dimension selected by a user; and displaying a service object associated with the sub-dimension selected by the user through the display according to an association relationship between the service object and the sub-dimension.

In implementations, the present disclosure further provides a method for processing map data, which provides map data of a target city. The method includes: providing at least one divided dimension, each divided dimension corresponding to at least one sub-dimension; determining a regional scope corresponding to at least one sub-dimension of the divided dimension on the map of the target city according to different divided dimensions; and determining an association relationship between a service object and the sub-dimension according to a location relationship between geographical relationship information of the service object and the regional scope, the sub-dimension being used for displaying information of the service object associated with the sub-dimension after the sub-dimension is provided to a client and clicked.

In implementations, the present disclosure further provides a server. The server includes a memory, a processor, and a network communication port, wherein: the network communication port is configured to perform network data communications; the memory is configured to provide map data of a target city and store a computer program executable by the processor; the processor, when the computer program is executed, implements the following operation: providing at least one divided dimension, each divided dimension corresponding to at least one sub-dimension; determining a regional scope corresponding to at least one sub-dimension of the divided dimension on the map of the target city according to different divided dimensions; and determining an association relationship between a service object and the sub-dimension according to a location relationship between geographical relationship information of the service object and the regional scope, the sub-dimension being used for displaying information of the service object associated with the sub-dimension after the sub-dimension is provided to a client through the network communication port and clicked.

In implementations, the present disclosure further provides a method for displaying a service object. The method includes: displaying, by a client, a filtering interface, the filtering interface including a map and a divided dimension display area, wherein the map is divided into a plurality of regional scopes, the divided dimension display area includes at least one divided dimension and a plurality of corresponding sub-dimensions, the sub-dimensions corresponding to one of the plurality of regional scopes in the map; each of the sub-dimensions points to a service object set, and a geographical location of a service object in each service object set is located in a regional scope corresponding to a respective sub-dimension.

In implementations, the present disclosure further provides a client. The client includes a memory, a processor, and a display, wherein: the display is configured to display page information; the memory is configured to store a computer program that is executable by the processor; and the processor, when the computer program is executed, implements the following operation: displaying a filtering interface through the display, the filtering interface including a map and a divided dimension display area, wherein the map is divided into a plurality of regional scopes, the divided dimension display area includes at least one divided dimension and a plurality of corresponding sub-dimensions, the sub-dimensions corresponding to one of the plurality of regional scopes in the map; each of the sub-dimensions points to a service object set, and a geographical location of a service object in each service object set is located in a regional scope corresponding to a respective sub-dimension.

The method for displaying a service object, the method for processing map data, the client and the server provided by the embodiments of the present disclosure can simultaneously provide a map display area and a divided dimension display area to a user. As such, the user can define filtering condition(s) by selecting a regional scope in the map display area, or selecting a sub-dimension in the divided dimension display area. During a selection process, the user can know where a selected geographical region is located in a city without the need of performing additional operations of location query.

BRIEF DESCRIPTION OF THE DRAWINGS

In order to illustrate the technical solutions of the embodiments of the present disclosure or existing technologies more clearly, accompanying drawings to be used in the description of the embodiments or the existing technologies is briefly described herein. Apparently, the accompanying drawings in the following description merely represent some embodiments described in the present disclosure. Based on these accompanying drawings, one skilled in the art can also obtain other drawings without making any inventive effort.

DETAILED DESCRIPTION

In order to enable one skilled in the art to better understand the technical solutions in the present disclosure, the technical solutions in the embodiments of the present disclosure will be clearly and completely described hereinafter with reference to the accompanying drawings in the embodiments of the present disclosure. The embodiments represent only some and not all of the embodiments of the present disclosure. All other embodiments obtained by one of ordinary skill in the art based on the embodiments of the present disclosure without making any inventive effort shall fall within the scope of protection of the present disclosure.

The embodiments of the present disclosure provide a method for displaying a service object. The method can be applied to a client. In implementations, the client may be an electronic device for displaying page information. Specifically, the client may be, for example, a desktop computer, a tablet computer, a notebook computer, a smart phone, a digital assistant, a smart wearable device, a shopping guide terminal, a television set with a network access function, etc. Alternatively, the client may also be software capable of running in the above electronic device. Specifically, the client may be a browser in an electronic device, and the browser may be loaded with an access portal provided by a hotel reservation platform. The hotel reservation platform may be, for example, a Ctrip website, a Home Inn website, a Hanting website, etc. The access portal may be a homepage of the hotel reservation platform. The client may also be an application running on a smart terminal provided by a hotel reservation platform. For example, the application may be a Ctrip travel, a mobile Home Inn, an Ivmama travel, etc.

Figure 1:
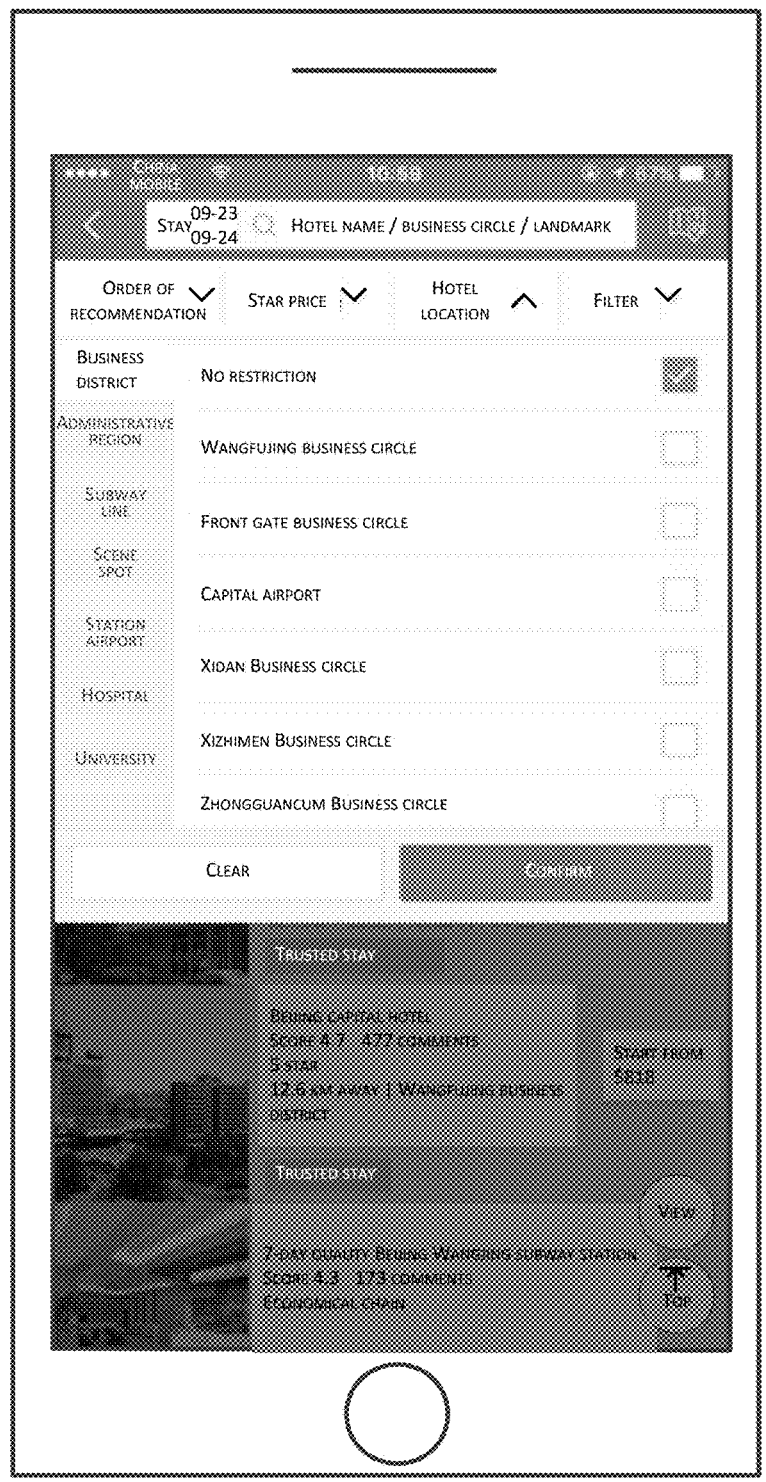
FIG. 1 is a page display diagram of a hotel reservation in the existing technologies.
Figure 2:
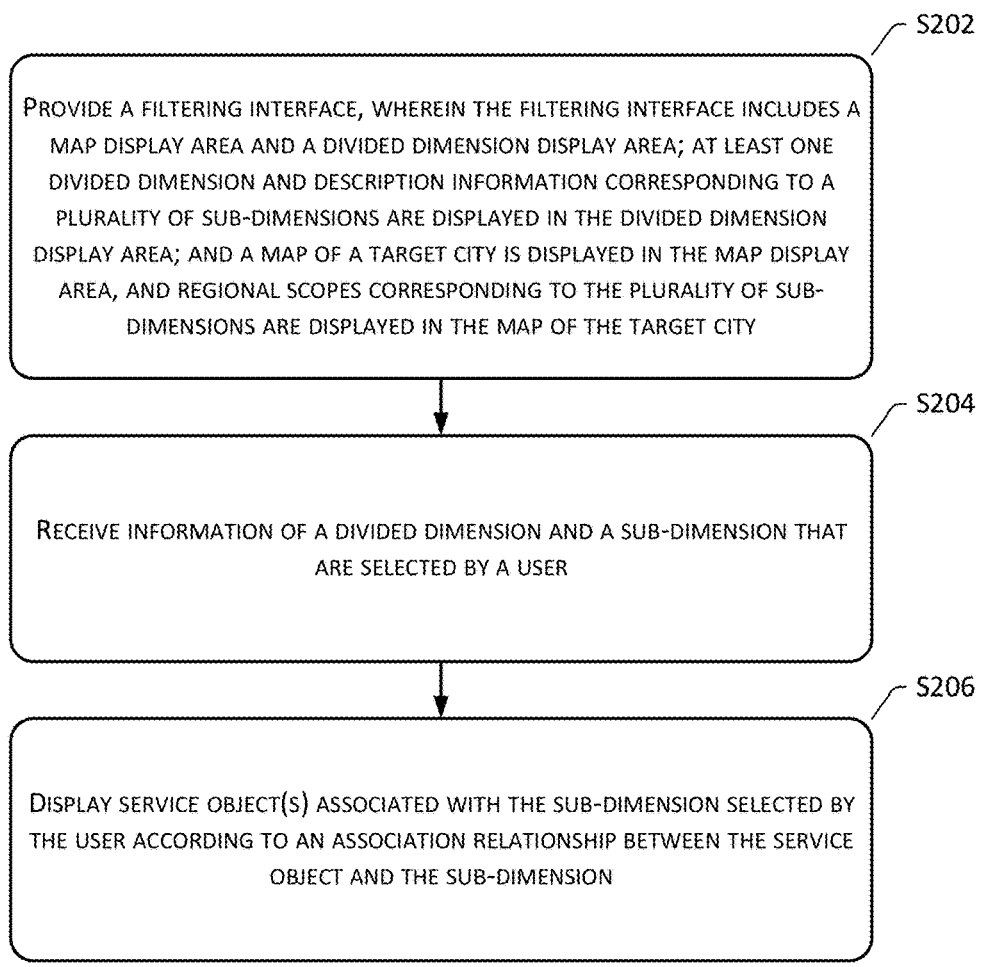
FIG. 2 is a flowchart of a method for displaying a service object according to the embodiments of the present disclosure.

Referring to FIG. 2, a method 200 for displaying a service object is provided according to the embodiments of the present disclosure. A database may be provided in the method. The database stores an association relationship between service objects and at least one sub-dimension of different divided dimensions. The method 200 can include the following operations.

S202: Provide a filtering interface, wherein the filtering interface includes a map display area and a divided dimension display area; at least one divided dimension and description information corresponding to a plurality of sub-dimensions are displayed in the divided dimension display area; and a map of a target city is displayed in the map display area, and regional scopes corresponding to the plurality of sub-dimensions are displayed in the map of the target city.

In implementations, after a user inputs a preliminary filtering condition, the client may provide a service object list page to the user. The preliminary filtering condition may be a city to stay, a check-in period, etc. For example, the user enters a city as Beijing, and check-in period to be from September 23 to September 24 in the client. In this way, the client can provide a service object list page to the user. Each search item can be ordered in the service object list page according to factors such as distance, score, price, and the like. A plurality of filtering controls may also be included in the service object list page. The filtering controls may include, for example, recommended ranking, star rating, hotel location, and the like. In implementations, the filtering interface may be invoked when a filtering control is clicked. For example, when the hotel location is clicked, a filtering interface, such as the one as shown in FIGS. 3 and 4, can be displayed in the client.

Figure 3:
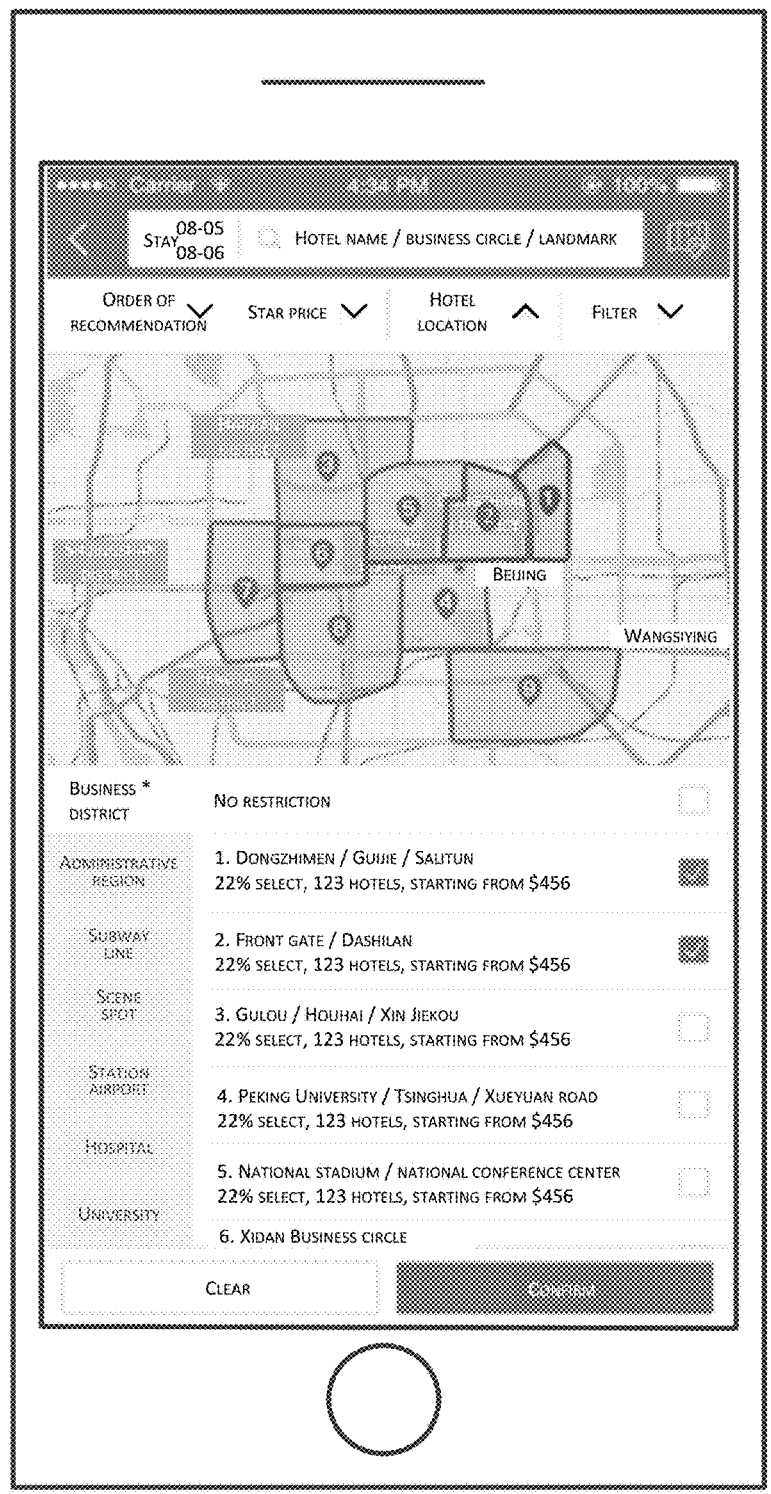
FIG. 3 is a display diagram of a form of a regional scope according to the embodiments of the present disclosure.
Figure 4:
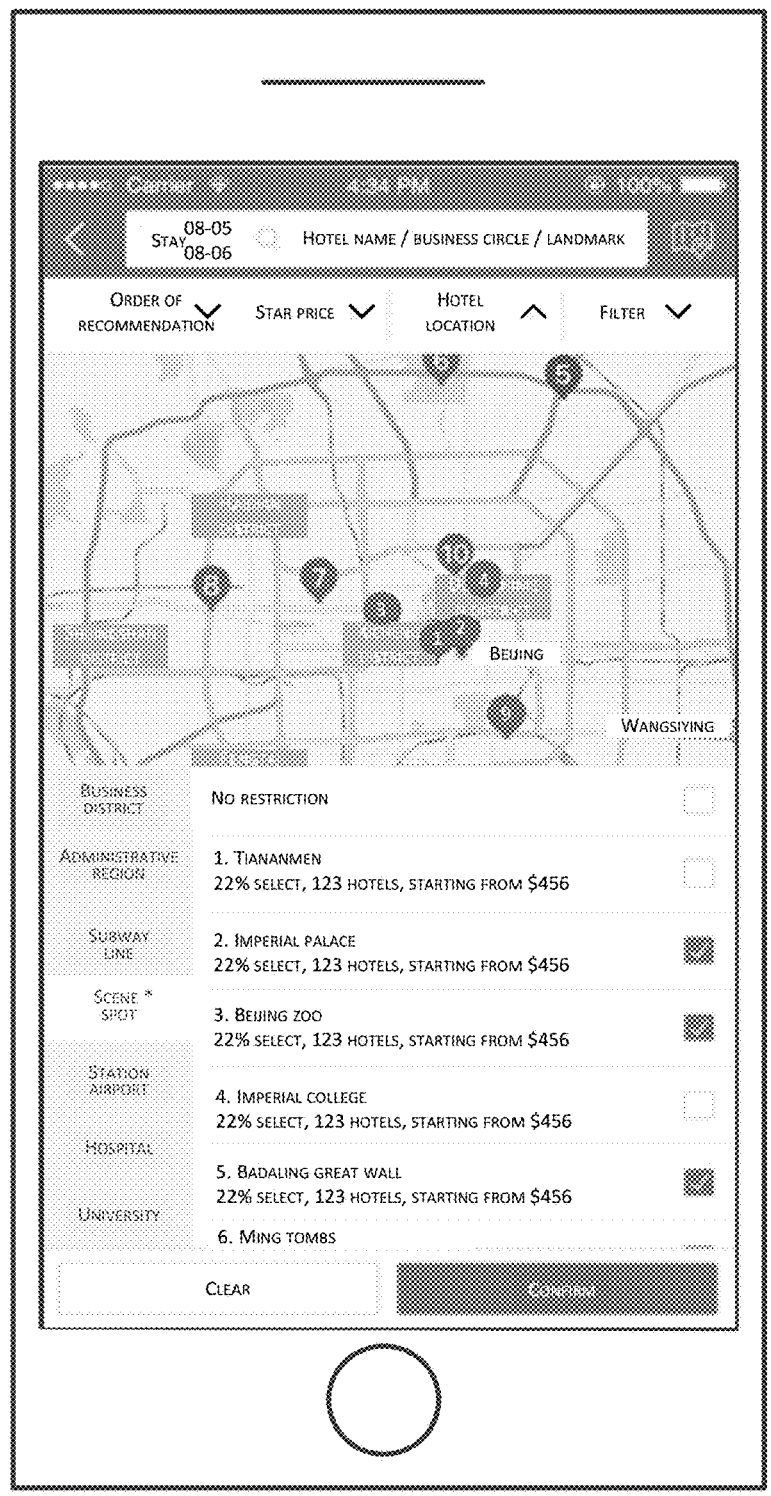
FIG. 4 is a display diagram of another form of a regional scope according to the embodiments of the present disclosure.

Referring to FIG. 3 and FIG. 4, in implementations, a map display area and a divided dimension display area may be included in the filtering interface. The map display area may be a data container used for displaying a target city map. A map displayed in the map display area can interact with the user. Specifically, the user can adjust a display position and a display size of the map through common gestures such as clicking, dragging, and two-finger swiping.

In implementations, the filtering interface may further include a divided dimension display area. The divided dimension display area can be used for displaying entries for various geographical regions of the target city. Specifically, at least one divided dimension may be included in the divided dimension display area. The divided dimension may include, for example, administrative regions, subway lines, points of attraction, business districts, hospitals, universities, etc. More specific sub-dimensions can be included in each divided dimension. For example, specific points of attraction such as Tiananmen Square, the Forbidden City, and the Beijing Zoo, etc., may be included in the points of attraction.

In implementations, each divided dimension and corresponding sub-dimensions can be displayed through description information. The description information may include name information of a divided dimension and name information of a sub-dimension. The name information of the divided dimension may be used for representing types of the sub-dimensions. For example, the name information of the divided dimension may be a school, a hospital, a business district, etc. The name information of the sub-dimension can be used for representing a geographical location of the sub-dimension. For example, the name information of the sub-dimension may be Tiananmen, Badaling, the Forbidden City, etc.

In implementations, each sub-dimension may point to a service object set. Service objects included in the service object set may also be different for different applications. For example, if an application in a current client can implement a function of hotel reservation, the service object set may then include information of each hotel. For another example, if the application in the current client can implement a function of cinema search, the service object set may then include information of each cinema. Therefore, in implementations, the service object set may be a set of service objects having geographical location information. In this way, each service object in the service object set pointed to by the sub-dimension can have an association relationship with the sub-dimension. This association relationship can be stored in a database. The database may be located in an independent server or may be stored in the client by means of downloads and updates. The present disclosure does not limit a form of implementation of the database.

In implementations, each service object set may include service object(s) located in a geographical region identified by at least one sub-dimension. For example, if a sub-dimension is "Tiananmen", then a geographical region identified by such sub-dimension may be an area within 5 kilometers of Tiananmen. In this case, service objects located in a geographical region identified by this sub-dimension can be a hotel, a KTV, a movie theater, a bank, etc. that are located within 5 kilometers of Tiananmen.

In implementations, at least one regional scope used for identifying a geographical region may be displayed in the map display area. The regional scope in the map display area may correspond to a sub-dimension in the divided dimension display area. Specifically, if a sub-dimension in the divided dimension display area is Tiananmen, the map display area may also have a regional scope of Tiananmen, and the regional scope corresponds to the sub-dimension of Tiananmen. This type of correspondence relationship is reflected by the ability of synchronously selecting or synchronously unselecting the sub-dimension and the regional scope corresponding to the sub-dimension in the map display area.

Specifically, in implementations, the regional scope may refer to a control that is displayed on a map and is capable of interacting with a user. In implementations, the regional scope can be used for identifying a geographical region on the map. Identifying the geographical region by the regional scope may include a shape of the regional scope being adapted to a scope of the geographical region or the regional scope being located at the geographical region. Specifically, a geographical region usually has a certain scope of coverage when appearing as a regional location on a map. At this time, a regional scope identifying the geographical region may be expressed as a polygon, and a shape of this polygon may be conformed to a shape of the regional location. For example, a divided dimension of administrative region may include regional locations such as Dongzhimen, Qianmen, and Drum Tower, etc. In this case, areas identifying these administrative regions can be polygons that can approximately cover corresponding administrative regions. In addition, when a geographical region appears as a point location on a map, a regional scope identifying such geographical region may also be represented as a point. As such, the regional scope may be located at the corresponding geographical region. For example, in a divided dimension of point of attraction, points of attraction such as Tiananmen, the Forbidden City, and Beijing Zoo, although points of attraction such as Tiananmen, the Forbidden City, and Beijing Zoo actually occupy certain areas, sizes of these points of attraction can be appeared as point locations on the map as compared with administrative regions. Therefore, areas identifying these points of attraction may be dot-shaped regional scopes having a relatively small area. These dot-shaped regional scopes may be located at corresponding points of attraction.

It should be noted that, during practical applications, since a map can be scaled according to an interactive gesture of a user, a coverage area of each geographical region is different under different scaling ratios. As such, when a location of a point of attraction as described above is enlarged, a coverage area occupied thereby may occupy a large area of the map display area. In this case, a scope of a dot-shaped area that is originally used to identify the point of attraction may be converted into a block-shaped regional scope. Similarly, a size of such block-shaped regional scope can be matched to an area of the enlarged point of attraction. Similarly, when the map in the map display area is reduced, the original block-shaped regional scope can also be converted into a dot-shaped regional scope accordingly.

Figure 5:
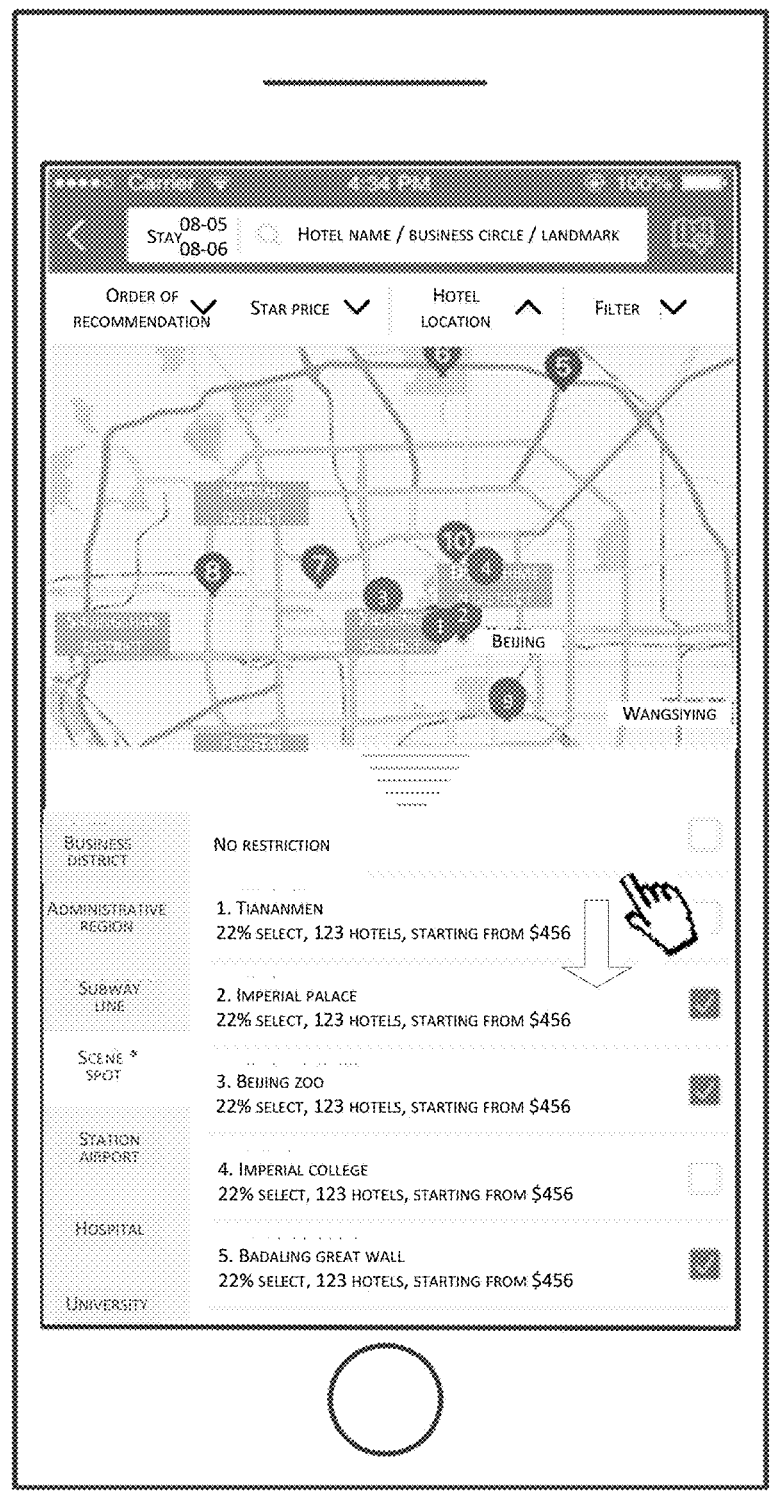
FIG. 5 is a schematic diagram of loading a sub-dimension in a divided dimension display area according to the embodiments of the present disclosure.
Figure 6:
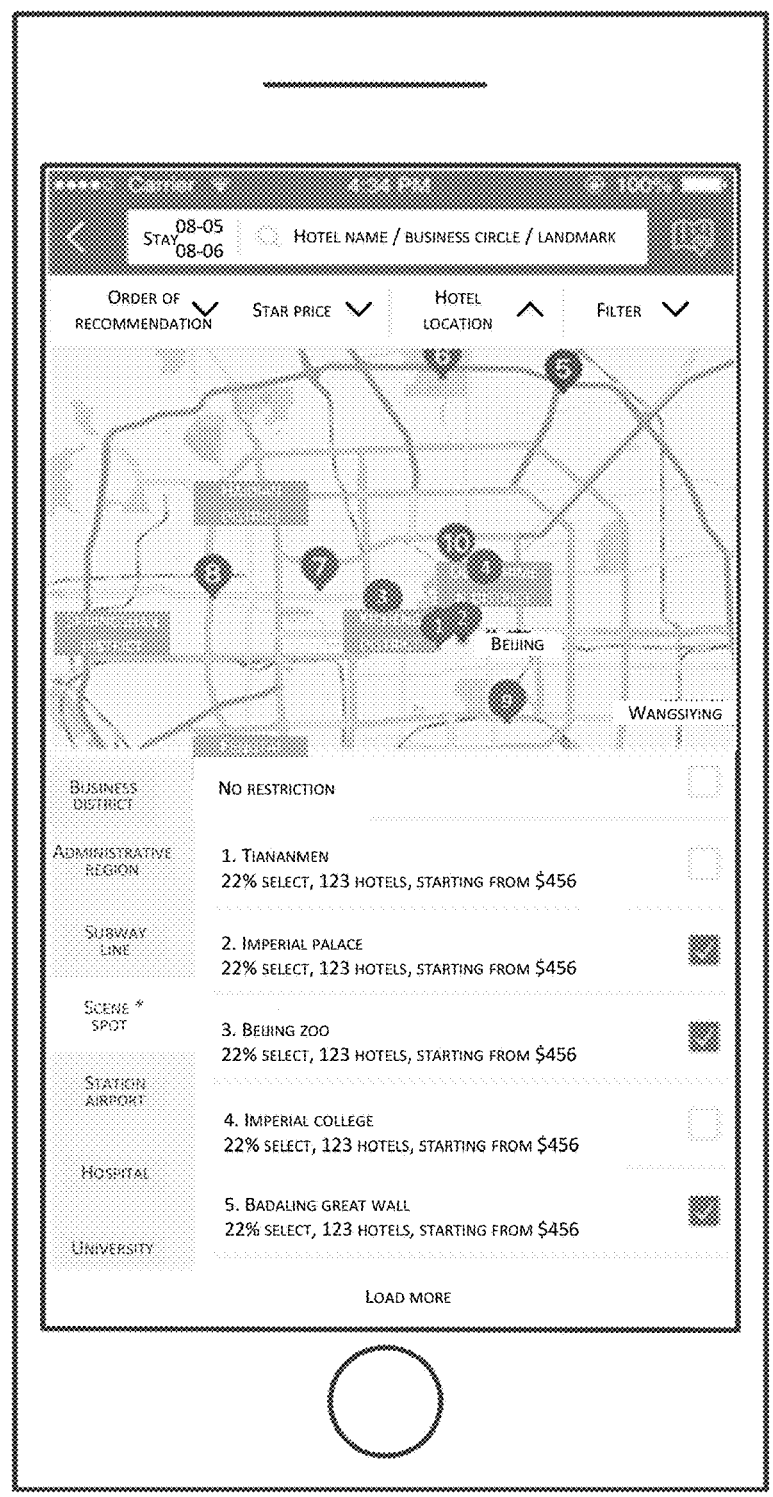
FIG. 6 is another schematic diagram of loading a sub-dimension in a divided dimension display area according to the embodiments of the present disclosure.

In implementations, the map display area and the divided dimension display area may be included in a same page. Sizes and positions of the map display area and the divided dimension display area may be configured in advance in this page. For example, the map display area may be located above the divided dimension display area. The number of sub-dimensions initially displayed in the divided dimension display area and the number of new additions per refresh may also be configured in advance. For example, the initial number of sub-dimensions displayed in the divided dimension display area may be five, and the number of new sub-dimensions may be five. In this way, when the filtering interface is initially displayed, five sub-dimensions can be displayed in the divided dimension display area. Referring to FIG. 5, the user can load more sub-dimensions into the divided dimension display area by dragging the filtering interface upwards or downwards. Apparently, other ways of loading sub-dimensions into the divided dimension display area can also exist. For example, referring to FIG. 6, written characters of "Load More" can be displayed at the bottom of the divided dimension display area. Subsequent sub-dimensions can be displayed after the user clicks on the written characters. Therefore, the present disclosure does not have any limitations on the way of loading more sub-dimensions into the divided dimension display area. After more sub-dimensions are loaded, the user can browse through these additional sub-dimensions by sliding down the filtering interface.

As the number of loaded sub-dimensions increases, the map displayed in the map display area may gradually disappear from the current page when the user browses the filtering interface downwards. This may be disadvantageous for the user to determine an actual position of a sub-dimension in the map. Accordingly, in another embodiment of the present disclosure, the map display area and the divided dimension display area may also be located in different pages. The map display area can always be displayed in a fixed position in a display of the client, and upward or downward navigation of sub-dimensions in the divided dimension display area can be performed by sliding the page. The position of the map display area can always be the same while the divided dimension display area is being slid. In this way, no matter how the user slides the divided dimension display area, the map display area can always be seen on the display of the client, thus helping the user to view an actual position of each sub-dimension in the map.

In implementations, a regional scope in the map display area and a sub-dimension in the divided dimension display area may have an association relationship. Specifically, a regional scope and a sub-dimension that identify a same geographical region can be associated with each other. For example, in the map display area, a regional scope identifying the Dongzhimen administrative region may be associated with a sub-dimension that includes a written character of Dongzhimen in the divided dimension display area. A regional scope and a sub-dimension that are associated can be selected synchronously or unselected synchronously.

In implementations, a regional scope in the map display area may be in one-to-one correspondence with a sub-dimension in the divided dimension display area. For example, if the divided dimension display area includes 5 sub-dimensions, only 5 regional scopes corresponding thereto can be displayed in the map display area. When more sub-dimensions are loaded into the divided dimension display area, only regional scopes corresponding to these newly loaded sub-dimensions may be displayed in the map display area. Alternatively, regional scopes corresponding to all sub-dimensions that have been loaded may also be displayed. Alternatively, after the number of regional scopes displayed currently reaches a preset limited value, the regional scopes that are displayed currently are cleared, and regional scopes corresponding to newly loaded sub-dimensions are displayed.

S204: Receive information of a divided dimension and a sub-dimension that are selected by a user.

In implementations, information of a divided dimension and a sub-dimension that are selected by a user may refer to the user interacting with a regional scope in the map display area or interacting with a divided dimension and a sub-dimension in the divided dimension display area. When a regional scope in the map display area is selected, a sub-dimension of a same geographical region that is identified by the regional scope is also automatically selected. Similarly, when a sub-dimension in the divided dimension display area is unselected, a regional scope that identifies a same geographical region of the sub-dimension is also automatically unselected.

In implementations, an initial state of a regional scope in the map display area may be unselected. When the user clicks on the regional scope once, the state of the regional scope can be changed to "selected". When the user clicks on the regional scope again, the state of the regional scope can be changed to "not selected" again. In this way, the user can change a state corresponding to a regional scope by clicking on the regional scope.

In implementations, the user can click on a divided dimension in the divided dimension display area to select a type of currently displayed sub-dimension. For example, after the user clicks on a "business district", a currently displayed sub-dimension can be a geographical location name of each target business district in the target city. Furthermore, the user can continue to click on a sub-dimension in a current divided dimension, so that the sub-dimension can be selected.

In implementations, in addition to including a text description of a geographical region, a sub-dimension may also include a control used for indicating whether the sub-dimension is selected. The control used for indicating whether the sub-dimension is selected may be a check box corresponding to the text description of the geographical region. An initial state of each check box can be blank, indicating that it is not selected. When the user clicks on a check box once, a symbol indicating that it is selected appears in the check box. The symbol can be, for example, a hook, a fork, or other predefined symbol. When the user clicks the check box again, the symbol in the check box disappears, and the check box is blank again, indicating that it is not selected.

As can be seen from above, when determining a location of a hotel, a user can directly select a geographical region by clicking a regional scope in a map display area, or can select a geographical region by interacting with a sub-dimension in a divided dimension display area. select. In this way, the user can know in real-time exactly where the selected geographical region is located in the city, without the need of performing a search for the geographical region using other map applications.

S206: Display service object(s) associated with the sub-dimension selected by the user according to an association relationship between the service object and the sub-dimension.

In implementations, each sub-dimension may point to a respective set of service objects. Therefore, after a sub-dimension is selected, service object(s) associated with the selected sub-dimension may be displayed to the user according to an association relationship between the service object(s) and the sub-dimension.

In implementations, after selecting a target sub-dimension in the filtering interface, the user can click a button that is used for searching. A button used for searching may be, for example, "confirm", "search", "query", and the like. After clicking on the button used for searching, the client can display a search result page for the target sub-dimension. In implementations, the search result page for the target sub-dimension may refer to service objects in the search result page conforming to the target sub-dimension. For example, if the user selects a sub-dimension "Tiananmen" in the filtering interface, the client can display a hotel search result page that meets the sub-dimension of "Tiananmen" to the user after the user clicks the button used for searching. Specifically, various hotels within 5 kilometers from Tiananmen which acts as the center can be displayed in the hotel search result page to the user. Each service object may include a service object identifier. The service object identifier may be a name of the respective service object such as a hotel, a KTV, a cinema, etc., and the service object identifier may be edited in advance by a manager of the service object.

It should be noted that a hotel inquiry is used as an example above when the technical solutions of the present disclosure are described. One skilled in the art should understand that this type of example is intended for the sake of illustrating the technical solutions only, and the technical solutions of the present disclosure are not limited to such simple scenario of hotel inquiry. It is conceivable that the technical solutions of the present disclosure can also be applied to any scenarios involving a query about geographical region, such as a cinema inquiry, a game room inquiry, a KTV inquiry, etc., which are also within the scope of protection of the present disclosure.

In an embodiment of the present disclosure, the regional scope and the sub-dimension may each include a location identifier, and the location identifier may be a predefined number or character. For example, the current map display area has a total of five regional scopes, and the divided dimension display area also includes five sub-dimensions. In this case, position identifiers of the five regional scopes may be 1 to 5 respectively. Similarly, position identifiers of the five sub-dimensions may also be 1 to 5 respectively. In implementations, in order to ensure the consistency of geographical regions, a regional scope and a sub-dimension identifying the same geographical region may have the same location identifier. For example, a location identifier identifying a regional scope and a sub-dimension of Tiananmen can be b.

In an embodiment of the present disclosure, in order to be able to clearly distinguish which regional scopes are selected and which regional scopes are not selected, at least two background colors may be associated for each regional scope. In implementations, regional scope information selected by the user in the map display area may be received. The regional scope information can define regional scopes that are selected and regional scopes that are not selected by the user. Specifically, when a preset regional scope is selected, the preset regional scope may be presented with a first background color. When the preset regional scope is not selected, the preset regional scope may be presented with a second background color. The first background color and the second background color are different. For example, a regional scope may be blue in color in the map display area when not being selected. Once selected, the regional scope may be shown in red color. In this way, when the user selects a sub-dimension containing a text description, a corresponding regional scope can be shown in red color, and the user can know where a geographical region corresponding to the currently selected sub-dimensions is located in the city.

In an embodiment of the present disclosure, different display forms of regional scopes may be determined for different geographical regions according to areas occupied by the geographical regions in the map display area. For example, for a geographical region in an administrative region, an area thereof in the map display area is typically large. Therefore, for this type of geographical region, a block-shaped regional scope can be utilized. A contour of the block-shaped regional scope can be consistent with a contour of the geographical region. For a geographical region in a point of attraction, an area occupied thereby in the map display area is usually small. Therefore, for this type of geographical region, a dot-shaped regional scope can be utilized. A dot-shaped regional scope can be located at a location of a corresponding point of attraction. For different types of geographical regions, distinctions can be made using different divided dimensions. The divided dimensions may include, for example, administrative regions, points of attraction, hospitals, universities, and the like. In this case, a display form of a regional scope can be associated with a current divided dimension.

In implementations, an operational instruction of a user for switching from a first divided dimension to a second divided dimension may be received. In this way, in response to the operational instruction, a regional scope in the map display area may be switched from a first display form to a second display form. The first display form is associated with the first divided dimension, and a second display form is associated with the second divided dimension. For example, when switching from a filtering condition associated with administrative region to a filtering condition associated with point of attraction, a regional scope in the map display area can be switched from a block shape to a dot shape.

In an embodiment of the present disclosure, the number of regional scopes to be displayed in the map display area may be very large. If all are displayed, it will be very messy, and the user is not easy to make a selection accurately. Therefore, in implementations, when the number of regional scopes to be displayed in the map display area is greater than a preset threshold, the regional scopes to be displayed may be divided into at least two regional scope subsets. The number of regional scopes included in each of the regional scope subsets is less than or equal to the preset threshold. In implementations, the preset threshold may be the maximum number of regional scopes that are simultaneously displayed in the map display area. When the number of regional scopes to be displayed is greater than this maximum number, the regional scopes can be displayed in individual batches. Regional scopes of each batch can be located in a regional scope subset. In order to enable displaying each regional scope in a regional scope subset at one time, when regional scope subsets are demarcated, the number of regional scopes included in each regional scope subset may be set to be less than or equal to the maximum number of regional scopes that is defined by the map display area for display at one time.

In implementations, when regional scopes to be displayed are divided into at least two regional scope subsets, regional scopes in each regional scope subset may be displayed one by one in the map display area. Specifically, regional scopes of one of the regional scope subsets may be displayed in the map display area, and regional scopes of another regional scope subset is displayed after receiving a content refresh instruction issued by a user.

In implementations, a way of refreshing content in the map display area may include performing a refresh by refreshing a sub-dimension in the divided dimension display area or directly performing a refresh according to a refresh button in the map display area. Specifically, the user loads more sub-dimensions by pulling up or sliding down the divided dimension display area, or clicking written characters of "Load More" at the bottom of the divided dimension display area. For example, sub-dimensions of five points of attraction are displayed in the current divided dimension display area, and similarly, corresponding five regional scopes are also displayed in the map display area. After the divided dimension display area is pulled down, sub-dimensions of five remaining points of attraction may continue to be loaded into the divided dimension display area, and the five initial regional scopes may be cleared from the map display area. Only regional scopes corresponding to the five recently loaded points of attraction are displayed. Furthermore, in implementations, a refresh button may be set in advance in the map display area. If regional scopes of five points of attraction are currently displayed in the map display area, the regional scopes of the five points of attraction can be cleared from the map display area when the user clicks the refresh button, and regional scopes of five other points of attraction are displayed. It should be noted that refreshed content needs to be synchronized in both a map display area and a divided dimension display area whether a refresh is performed through the divided dimension display area or a refresh is performed through the map display area. For example, by clicking a refresh button in the map display area, regional scopes of five other points of attraction are displayed. In this case, sub-dimensions corresponding to these five points of attraction are automatically loaded into the divided dimension display area.

In implementations, the regional scopes to be displayed may be ordered according to different geographical regions. Specifically, ordering can be performed based on respective popularities of the geographical regions, respective numbers of visits by visitors, respective ranking levels of points of attraction, etc. In this way, regional scopes and sub-dimensions of each batch can be sequentially displayed in the map display area and the divided dimension display area according to an ordering result. Apparently, during practical applications, a certain number of regional scopes and sub-dimensions may be randomly displayed after each refresh, which is not limited in the present disclosure.

In an embodiment of the present disclosure, a user may only have a desired destination when making a travel plan, and does not have a detailed touring plan in the destination. In this case, in order to better provide the user with a touring strategy, remark information may also be added in each sub-dimension in addition to filtering identifiers used for indicating geographical regions in each sub-dimension. The remark information may include respective selection frequency parameters of the filtering identifiers and/or corresponding search result parameters of the filtering identifiers.

In implementations, a filtering identifier may be a textual description of a geographical region. For example, the filtering identifier may be Tiananmen, the Forbidden City, Beijing Zoo, etc. The remark information may be text information that is displayed along with the filtering identifier. A selection frequency parameter of the filtering identifier may be a ratio between the number of users who select a sub-dimension including the filtering identifier and the total number of users. The total number of users may refer to the number of users whose destination is the same as a currently selected destination. For example, the currently selected destination is Beijing, and there are 1.5 million of users with Beijing as the destination according to historical data. For example, 1.4 million of users have chosen a sub-dimension including Tiananmen, and a selection frequency parameter for Tiananmen can be approximately 93%. In this way, adding a selection frequency parameter of a filtering identifier in a sub-dimension allows a user to intuitively understand which places in a destination are relatively popular to visitors, thereby assisting the user in selecting a geographical region.

In implementations, a search result parameter corresponding to the filtering identifier may represent the number of options available in a location area corresponding to the filtering identifier and respective price information of the options. For example, a user clicks on a divided dimension associated with points of attraction when selecting a hotel location, "a total of 123 hotels, starting from 260 dollars" can be displayed under a filtering identifier of the Forbidden City in the divided dimension, from which "a total of 123 hotels" can be used as the number of hotels near the Forbidden City that are available for selection, and "starting from 260 dollars" can represent price information of the hotels. In this way, by adding a search result parameter corresponding to a filtering identifier in a sub-dimension, a user can be provided with general search information in advance without performing a final search, thereby further assisting the user in selecting a geographical region.

In implementations, the number of options available in the location area may be counted in the following manner: counting the number of options included in the location area, or counting the number of options included in a circular area having a preset radius and the location area as the center. Specifically, when the location area is such administrative region of a relatively large area, the number of options included in the location area can be directly counted. If the location area is a tourist attraction like the Forbidden City and Tiananmen, the number of options included can be counted in an area of 5 kilometers near the location area.

In an embodiment of the present disclosure, after the selection frequency parameters of the filtering identifiers are added in the sub-dimensions, the sub-dimensions in the divided dimension display area may be ordered according to the selection frequency parameters. Specifically, a sub-dimension having a larger selection frequency parameter can be placed in a more prominent position, so that the user can intuitively see which areas of the destination are more popular.

In a specific application scenario, a user makes a hotel reservation through Ctrip travel using a smartphone. After opening the Ctrip travel, the user can enter a hotel reservation system by selecting a hotel label on the homepage. In the hotel reservation system, the user can enter a target city of Beijing, and a stay period of Sep. 26, 2016 to Sep. 28, 2016. In this way, after the user clicks a confirmation button, Ctrip travel can jump to a preliminary search page for the hotels. The preliminary search page may include filtering labels for recommendation sorting, star rating, hotel location, and the like. The user can select a filtering label associated with hotel location, and a floating window of a filtering interface can be popped up on a current page. A map of Beijing and sub-dimensions of various locations below the map are displayed in the filtering interface. Sub-dimensions of each location are categorized according to divided dimensions of administrative regions, points of attraction, business districts, hospitals, and schools. The user clicks on a divided dimension associated with points of attraction, and this type may include sub-dimensions of points of attraction such as Tiananmen, the Forbidden City, and the Beijing Zoo, etc. Each point of attraction has a corresponding dot-shaped area in the map. Each sub-dimension of point of attraction can also have a type of written characters of "22% selection, 123 hotels, starting from 456 dollars", indicating that 22% of users who have Beijing as their destination have selected this point of attraction, there are 123 hotels within 5 km of this point of attraction, and the lowest price of the hotels is 456 dollars. In this way, the user can select a sub-dimension of point of attraction that he/she is interested in. When a sub-dimension of point of attraction is selected, a regional scope associated with the point of attraction on the map is also selected synchronously, so that the user knows where the selected point of attraction is located in Beijing.

In an embodiment of the present disclosure, the client may further receive a target sub-dimension selected by the user, and display a search result page for that target sub-dimension. The search result page includes at least one service object, where each service object includes a service object identifier and comment information that is adapted to the target sub-dimension.

In implementations, in order to facilitate the user to intuitively know the details of each service object, comment information adapted to the target sub-dimension may be added to each service object.

In implementations, the comment information is adapted to the target sub-dimension, which may mean that a sub-dimension selected by the user who edits the comment information is the same as the target sub-dimension. For example, a current user has the "Summer Palace" as a target sub-dimension. After clicking a search button, a search result page displays various hotels near the Summer Palace, where each hotel entry can contain at least one piece of comment information. These pieces of comment information can be edited by previous users after their stays. Sub-dimensions selected by these users who edited these pieces of comment information on their clients are also a sub-dimension of Summer Palace. In this way, directly providing the current user with comment information of other users having the same itinerary in the search result page can assist the current user to quickly select a search result, thereby avoiding the current user from the need of clicking search results one by one, and checking the statuses of pieces of comment information in details page of the search results one by one.

Figure 7:
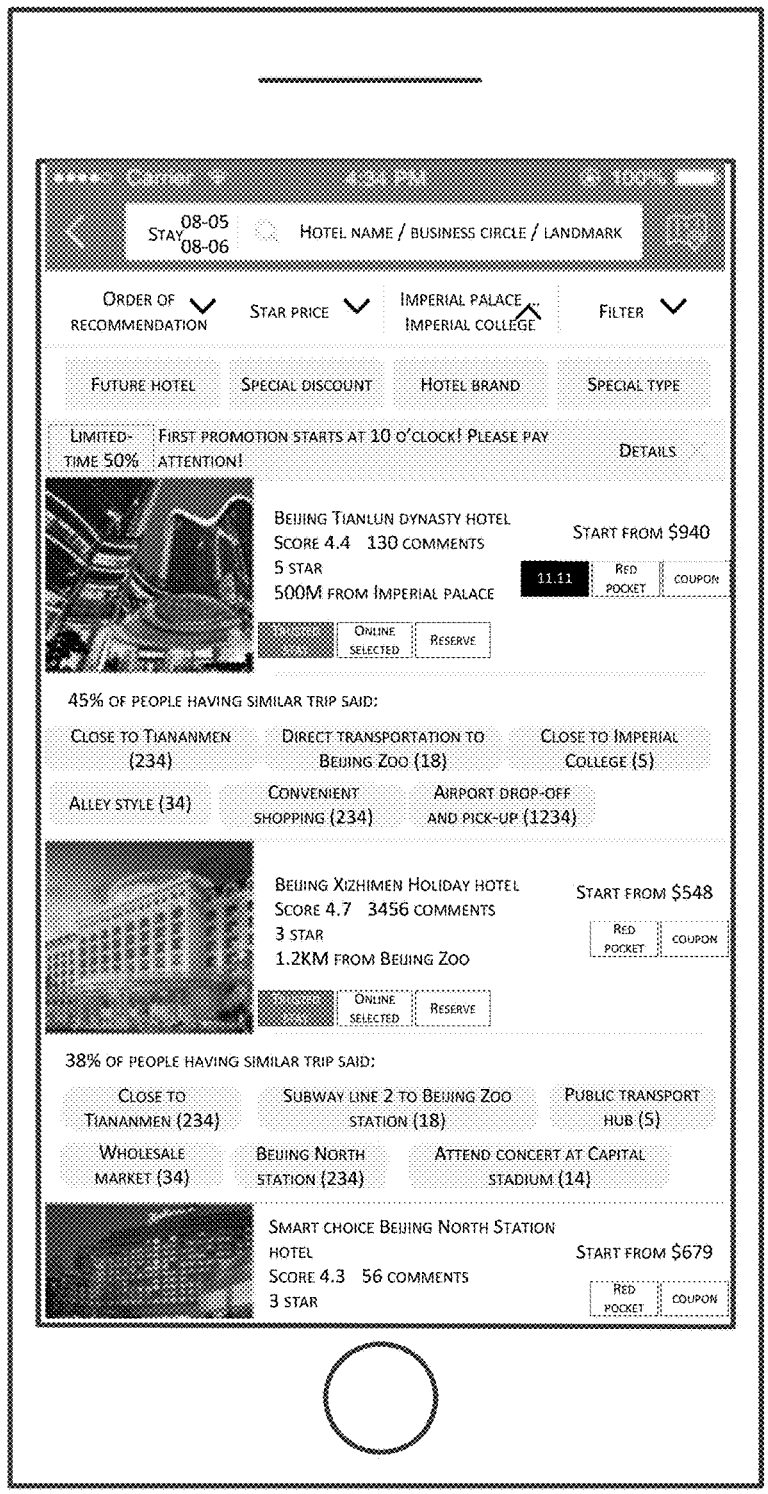
FIG. 7 is a schematic diagram of a search result page according to the embodiments of the present disclosure.

In an embodiment of the present disclosure, since a size of a service object is generally predefined, if entire comment information is displayed in the service object, the number of pieces of comment information that can be displayed is usually small. As such, an amount of information provided to the user is also small. Accordingly, in implementations, only comment labels of pieces of comment information can be displayed in the service object. A comment label may be a phrase extracted from each piece of comment information for indicating the meaning of that piece of comment information. For example, for such piece of comment information as "the hotel has just been renovated, and is especially clean, very satisfied", a comment label such as "especially clean" can be extracted therefrom. Specifically, analyses such as segmentation, feature extraction, sentiment analysis, etc., can be performed on comment information. In addition, since language habits of different users are different, each person may have different ways of expression for the same meaning. In implementations, extracted phrases may also be clustered and analyzed, and phrases having the same meaning are demarcated into one cluster. A representative phrase is assigned to each cluster, so that each representative phrase can be used as a comment label of a respective piece of comment information. For example, for phrases "cost-effective", "low price, good quality", and "good environment, such price is very valuable", "cost-effective" can be used as a unified comment label. In implementations, the number of comments corresponding to each comment tag may also be counted, and the number of comments of a comment tag is added to the comment information. Thus, referring to FIG. 7, the comment information may include a comment tag and the number of comments corresponding to the comment tag.

In an embodiment of the present disclosure, since a size of a service object is generally pre-defined, an amount of comment information that can be displayed is limited. In implementations, a preset threshold value for comment information that can be displayed may be set in advance. When an amount of comment information to be displayed in a service object is greater than a preset threshold, a piece of comment information with a relatively higher number of comments may be preferentially displayed. Specifically, in implementations, each piece of comment information may be sorted according to a number of comments in the respective comment information, and then an amount of target comment information corresponding to the preset threshold may be extracted from the sorted pieces of comment information, and is displayed in the service object. In implementations, a method for extracting target comment information may include: sequentially extracting an amount of the target threshold information according to a descending order of the number of comments, the amount corresponding to the preset threshold. During practical applications, the service object may also be configured to a refresh button for comment information. When the user clicks the refresh button for comment information, the client can display a subsequent amount of comment information, the amount corresponding to the preset threshold.

In an embodiment of the present disclosure, a ratio between the number of users who publish the comment information and the total number of users who use the service object may also be added to the service object. Using the service object may refer to an activity of completing an order through the service object. For example, the service object is "Beijing Dihao Hotel". When the user clicks on the service object and completes an order, the user has used the service object. Comment information of some of those users who use this service object is displayed in the service object. Although only a limited amount of comment information may be included in the service object, each piece of comment information may correspond to a plurality of comments, and each comment may represent one user. As such, each piece of comment information may correspond to multiple users who post the comment information. In this way, the number of users corresponding to the comment information displayed in the service object can be counted, and a ratio between the number of users who are counted and the total number of users who use the service object can be calculated. The ratio is displayed in the service object. In a practical application scenario, a pre-edited statement format may be added. The statement format may be, for example, "22% of users who have your similar itinerary as yours say:", where 22% can be the calculated ratio.

In implementations, when counting the number of users corresponding to the comment information displayed in the service object, the number of comments corresponding to each comment label may be added to obtain the number of users corresponding to the comment information that is displayed. The ratio can be obtained by dividing the number of users by the number of all the pieces of the comment information in the service object.

In an embodiment of the present disclosure, the user may select more than one sub-dimension in the filtering interface. For example, the user can select three points of attraction, i.e., "Tiananmen", "Forbidden City" and "Beijing Zoo", in a divided dimension associated points of attraction, and click a search button after selecting these three points of attractions. At this time, the client may determine service object(s) corresponding to each sub-dimension according to the above method for each sub-dimension, and then display service objects corresponding to the three sub-dimensions in a search result page. Specifically, the service objects corresponding to the three sub-dimensions may be sequentially displayed in an alternate manner. For example, service objects such as the first hotel, the second hotel, the third hotel, etc., can be obtained according to "Tiananmen". Service objects such as the fourth hotel, the fifth hotel, the sixth hotel, etc., can be obtained according to "Forbidden City". Service objects such as the seventh hotel, the eighth hotel, and the ninth hotel, etc., can be obtained according to "Beijing Zoo". At this time, a sequence of service objects in the search result page may be the first hotel, the fourth hotel, the seventh hotel, the second hotel, the fifth hotel, the eighth hotel, etc. In this way, the user can be provided with balanced information by sequentially displaying the service objects in an alternate manner. In implementations, service objects corresponding to various sub-dimensions may be sorted according to prices, evaluation scores, occupancy rates, etc., or may be sorted according to respective distances between locations corresponding to the sub-dimensions, which are not limited in the present disclosure.

Figure 8:
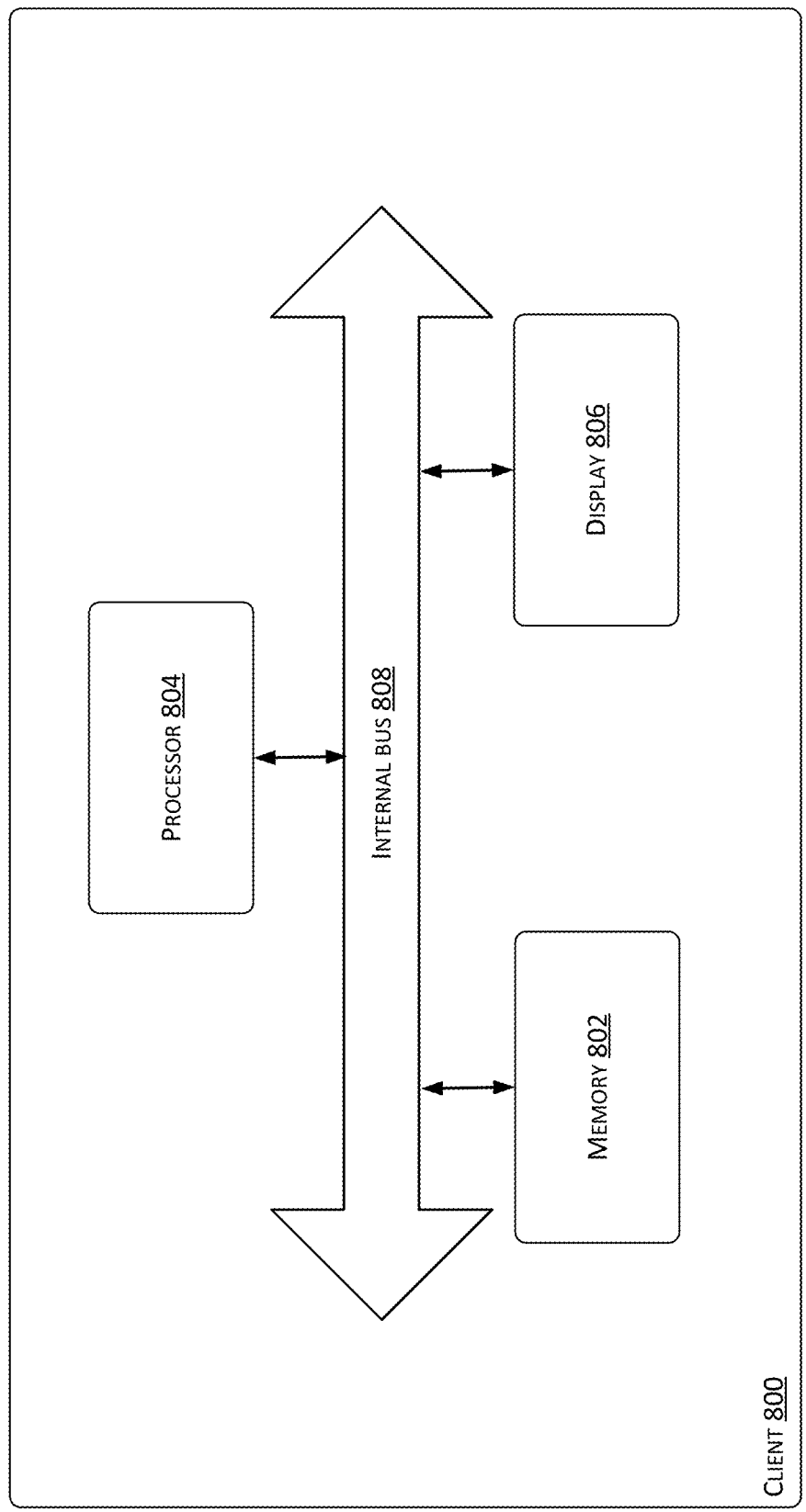
FIG. 8 is a schematic structural diagram of a client according to the embodiments of the present disclosure.

Referring to FIG. 8, the embodiments of the present disclosure further provide a client 800. The client 800 includes a memory 802, a processor 804, a display 806, and an internal bus 808.

The memory 802 is configured to provide a database and store a computer program executable by the processor, wherein the database stores an association relationship between service objects and at least one sub-dimension of different divided dimensions.

The display 806 is configured to display page information.

The processor 804 is configured to implement, when the computer program is executed, the following operations:

providing a filtering interface through the display 806, the filtering interface including a map display area and a dimension-divided display area, and the dimension-divided display area displaying at least one divided dimension and description information corresponding to a plurality of sub-dimensions; displaying a map of a target city in the map display area, the map of the target city displaying regional scopes corresponding to the plurality of sub-dimensions; receiving information of a divided dimension and a sub-dimension selected by a user; and displaying a service object associated with the sub-dimension selected by the user through the display 806 according to an association relationship between the service object and the sub-dimension.

In implementations, the memory 802 may be a memory device used for storing information. In a digital system, a device capable of storing binary data may be a memory. In an integrated circuit, a circuit having a memory function without a physical form may also be a memory, for example, a RAM, a FIFO, etc. In a system, a storage device having a physical form may also be called a memory, such as a memory stick, a TF card, or the like.

In implementations, the memory 802 may include a form of computer readable media such as a volatile memory, a random access memory (RAM) and/or a non-volatile memory, for example, a read-only memory (ROM) or a flash RAM. The memory 802 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the display 806 may be a display tool that displays a certain electronic file to a screen through a specific transmission device and then reflects it to the human eye. The display may include a liquid crystal LCD display, a cathode ray tube CRT display, a light emitting diode LED display, etc.

In implementations, the processor 804 can be implemented in any suitable manner. For example, a processor can employ, for example, a microprocessor or processor, and a form of computer readable media, logic gates, switches, application-specific integrated circuits (such as software or firmware), programmable logic controllers, and embedded microcontrollers etc., that store computer readable program codes executable by the (micro)processor. The present disclosure does not have any limitation thereon.

Specific functions implemented by the memory 802, the processor 804, and the display 806 of the client disclosed in the foregoing embodiments may be referenced with the embodiments of the method for displaying a service object on the client side in the present disclosure. The specific functions are able to implement the embodiments of the method for displaying the service object in the present disclosure, and achieve the technical effects of the method embodiments.

Figure 9:
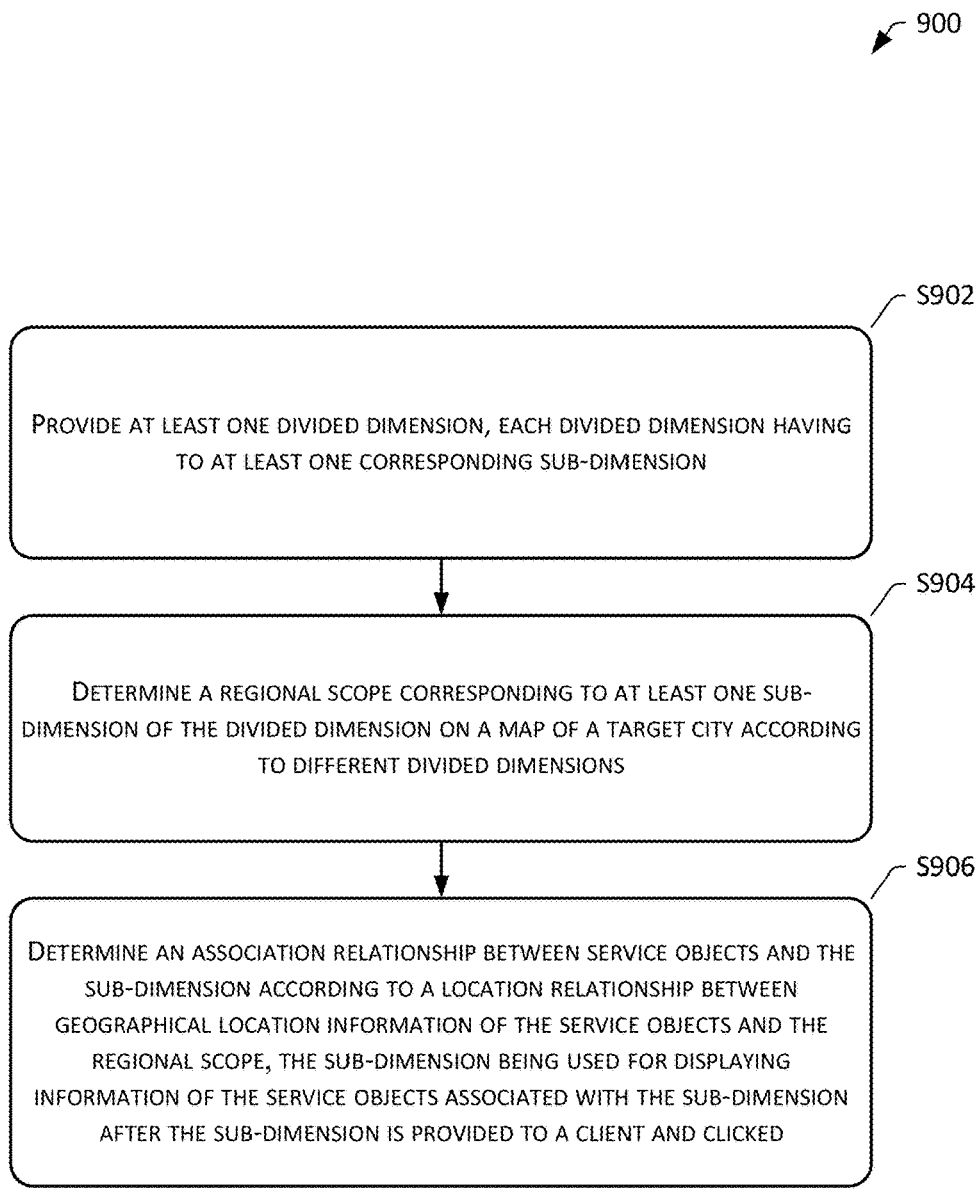
FIG. 9 is a flowchart of a method for processing map data according to the embodiments of the present disclosure.

Referring to FIG. 9, the embodiments of the present disclosure further provide a method 900 for processing map data. The method may be applied to server(s). The server(s) may be an electronic device having functions of data processing, storage, and network interaction. Alternatively, the server may be software running in the electronic device to provide support for data processing, storage, and network interaction. The number of the server(s) is not specifically limited in implementations. The server(s) may be a single server, or may be a plurality of servers, or a server cluster formed by multiple servers. In implementations, the server(s) may be a service server of an e-commerce website platform. The server server may store data related to the e-commerce website platform. For example, the service server may store registration information of users in the e-commerce website platform, various advertisements displayed on pages of the e-commerce website, and logs generated by the e-commerce website platform during runtime. In implementations, the method 900 provides map data of a target city, and the method 900 may include the following operations.

S902: Provide at least one divided dimension, each divided dimension having to at least one corresponding sub-dimension.

In implementations, a map and a divided dimension display area can be displayed in a filtering interface of the client. The divided dimension display area may be used to display entries of various geographical regions of the target city. Specifically, at least one divided dimension may be included in the divided dimension display area. The divided dimension may include, for example, an administrative region, a subway line, a point of attraction, a business district, a hospital, a university, etc. More specific sub-dimensions can be included in each divided dimension. For example, the points of attractions can include specific points of attraction, such as Tiananmen, the Forbidden City, and the Beijing Zoo, etc.

In implementations, each sub-dimension can be demarcated into different divided dimensions according to a respective type. Sub-dimensions that are located in a same divided dimension can have a same dimension ID. In addition, in order to distinguish different sub-dimensions, each sub-dimension in a same divided dimension may also have a unique sub-identifier. In this way, a sub-dimension can be uniquely determined by a combination of a dimension identifier and the sub-identifier.

In implementations, when the client displays the filtering interface, the client may send an interface display request to a server. The interface display request may include an identifier of a divided dimension to be displayed. In this way, according to the identifier of the divided dimension, the server may return information of sub-dimension(s) including the identifier of the divided dimension to the client. Currently, the interface display request may also include a combination of a dimension identifier and a sub-identifier of each sub-dimension. The server may also send information of at least one sub-dimension to the client according to the combination of the dimension identifier and the sub-identifier.

The information of the sub-dimension(s) can be displayed using description information. The description information may include name information of the divided dimension and the sub-dimension(s), wherein the name information of the divided dimension may be used for representing type(s) of the sub-dimension(s). For example, the name information of the divided dimension may be a school, a hospital, a business district, etc. The name information of the sub-dimension can be used to characterize a geographical location of the sub-dimension. For example, the name information of the sub-dimension may be Tiananmen, Badaling, the Forbidden City, etc.

In implementations, the filtering interface of the client may include a map display area, and the map data provided by the server may be displayed in the map display area.

S904: Determine a regional scope corresponding to at least one sub-dimension of the divided dimension on a map of a target city according to different divided dimensions.

In implementations, at least one regional scope for identifying a geographical region may be displayed in the map display area in the filtering interface. The regional scope in the map display area may correspond to the sub-dimension in the divided dimension display area. Specifically, if a sub-dimension in the divided dimension display area is Tiananmen, the map display area may also have a regional scope of Tiananmen, which corresponds to the sub-dimension of Tiananmen.

In implementations, a correspondence relationship between sub-dimensions and regional scopes may be stored in the server. In this way, when the server provides map data and sub-dimension information to the client, a regional scope corresponding to the at least one sub-dimension of the divided dimension may be determined on the map of the target city.

In implementations, the regional scope may refer to a control that is displayed on a map and is capable of interacting with a user. In implementations, the regional scope can be used for identifying a geographical region on the map. Identifying the geographical region by the regional scope may include a shape of the regional scope being adapted to a scope of the geographical region or the regional scope being located at the geographical region. Specifically, a geographical region usually has a certain scope of coverage when appearing as a regional location on a map. At this time, a regional scope identifying the geographical region may be expressed as a polygon, and a shape of this polygon may be conformed to a shape of the regional location. For example, a divided dimension of administrative region may include regional locations such as Dongzhimen, Qianmen, and Drum Tower, etc. In this case, areas identifying these administrative regions can be polygons that can approximately cover corresponding administrative regions. In addition, when a geographical region appears as a point location on a map, a regional scope identifying such geographical region may also be represented as a point. As such, the regional scope may be located at the corresponding geographical region. For example, in a divided dimension of point of attraction, points of attraction such as Tiananmen, the Forbidden City, and Beijing Zoo, although points of attraction such as Tiananmen, the Forbidden City, and Beijing Zoo actually occupy certain areas, sizes of these points of attraction can be appeared as point locations on the map as compared with administrative regions. Therefore, areas identifying these points of attraction may be dot-shaped regional scopes having a relatively small area. These dot-shaped regional scopes may be located at corresponding points of attraction.

S906: Determine an association relationship between service objects and the sub-dimension according to a location relationship between geographical location information of the service objects and the regional scope, the sub-dimension being used for displaying information of the service objects associated with the sub-dimension after the sub-dimension is provided to a client and clicked.

In implementations, each regional scope may point to a service object set. Service objects included in the service object set may also be different for different applications. For example, if a current application can implement a function of hotel reservation, the service object set may then include information of each hotel. For another example, if the current application can implement a function of cinema search, the service object set may then include information of each cinema. Therefore, in implementations, the service object set may be a set of service objects having information of a geographical location. In this way, since both the service objects and the regional scope are associated with the geographical location, and the sub-dimension is also associated with the geographical location, an association relationship between the service objects and the sub-dimension can be determined based on a location relationship between the geographical location of the service object and the regional scope. Thus, each service object set may include service object(s) located in a geographical region identified by at least one sub-dimension. For example, if a sub-dimension is "Tiananmen", then a geographical region identified by such sub-dimension may be an area within 5 kilometers of Tiananmen. In this case, service objects located in a geographical region identified by this sub-dimension can be a hotel, a KTV, a movie theater, a bank, etc. that are located within 5 kilometers of Tiananmen.

In implementations, after the sub-dimension is provided to the client, if the sub-dimension is clicked, this indicates that the sub-dimension is selected by the user. At this time, information of the service objects associated with the sub-dimension can be displayed in the client. Specifically, after selecting a target sub-dimension in the filtering interface, the user can click a button that is used for searching. A button used for searching may be, for example, "confirm", "search", "query", and the like. After clicking on the button used for searching, the client can display a search result page for the target sub-dimension. In implementations, the search result page for the target sub-dimension may refer to service objects in the search result page conforming to the target sub-dimension. For example, if the user selects a sub-dimension "Tiananmen" in the filtering interface, the client can display a hotel search result page that meets the sub-dimension of "Tiananmen" to the user after the user clicks the button used for searching. Specifically, various hotels within 5 kilometers from Tiananmen which acts as the center can be displayed in the hotel search result page to the user. Each service object may include a service object identifier. The service object identifier may be a name of the respective service object such as a hotel, a KTV, a cinema, etc., and the service object identifier may be edited in advance by a manager of the service object.

In an embodiment of the present disclosure, according to differences in divided dimensions, ways of displaying sub-dimensions corresponding to regional scopes on the map may also be different. Specifically, a geographical region usually has a certain scope of coverage when appearing as a regional location on a map. At this time, a regional scope identifying the geographical region may be expressed as a polygon, and a shape of this polygon may be conformed to a shape of the regional location. For example, a divided dimension of administrative region may include regional locations such as Dongzhimen, Qianmen, and Drum Tower, etc. In this case, areas identifying these administrative regions can be polygons that can approximately cover corresponding administrative regions. In addition, when a geographical region appears as a point location on a map, a regional scope identifying such geographical region may also be represented as a point. As such, the regional scope may be located at the corresponding geographical region. For example, in a divided dimension of point of attraction, points of attraction such as Tiananmen, the Forbidden City, and Beijing Zoo, although points of attraction such as Tiananmen, the Forbidden City, and Beijing Zoo actually occupy certain areas, sizes of these points of attraction can be appeared as point locations on the map as compared with administrative regions. Therefore, areas identifying these points of attraction may be dot-shaped regional scopes having a relatively small area. These dot-shaped regional scopes may be located at corresponding points of attraction.

In implementations, the divided dimension may include a business district, such that the sub-dimension may be a name of the business circle district. Then, when determining the regional scope corresponding to the at least one sub-dimension of the divided dimension on the map of the target city, a regional scope corresponding to a name of at least one business district in the map of the target city can be determined according to the business district.

In implementations, when determining the association relationship between the service objects and the sub-dimension, service objects with a geographical location in the business district may be determined as the service objects associated with the sub-dimension.

In another embodiment of the present disclosure, the divided dimension may include a point of attraction, such that the sub-dimension may be a name of the point of attraction. Then, when determining the regional scope corresponding to the at least one sub-dimension of the divided dimension on the map of the target city, a regional scope corresponding to a name of at least one point of attraction in the map of the target city can be determined according to the point of attraction.

In implementations, when determining the association relationship between the service objects and the sub-dimension, service objects with a geographical location that is within a preset range from the point of attraction location may be determined as the service objects associated with the sub-dimension.

Figure 10:
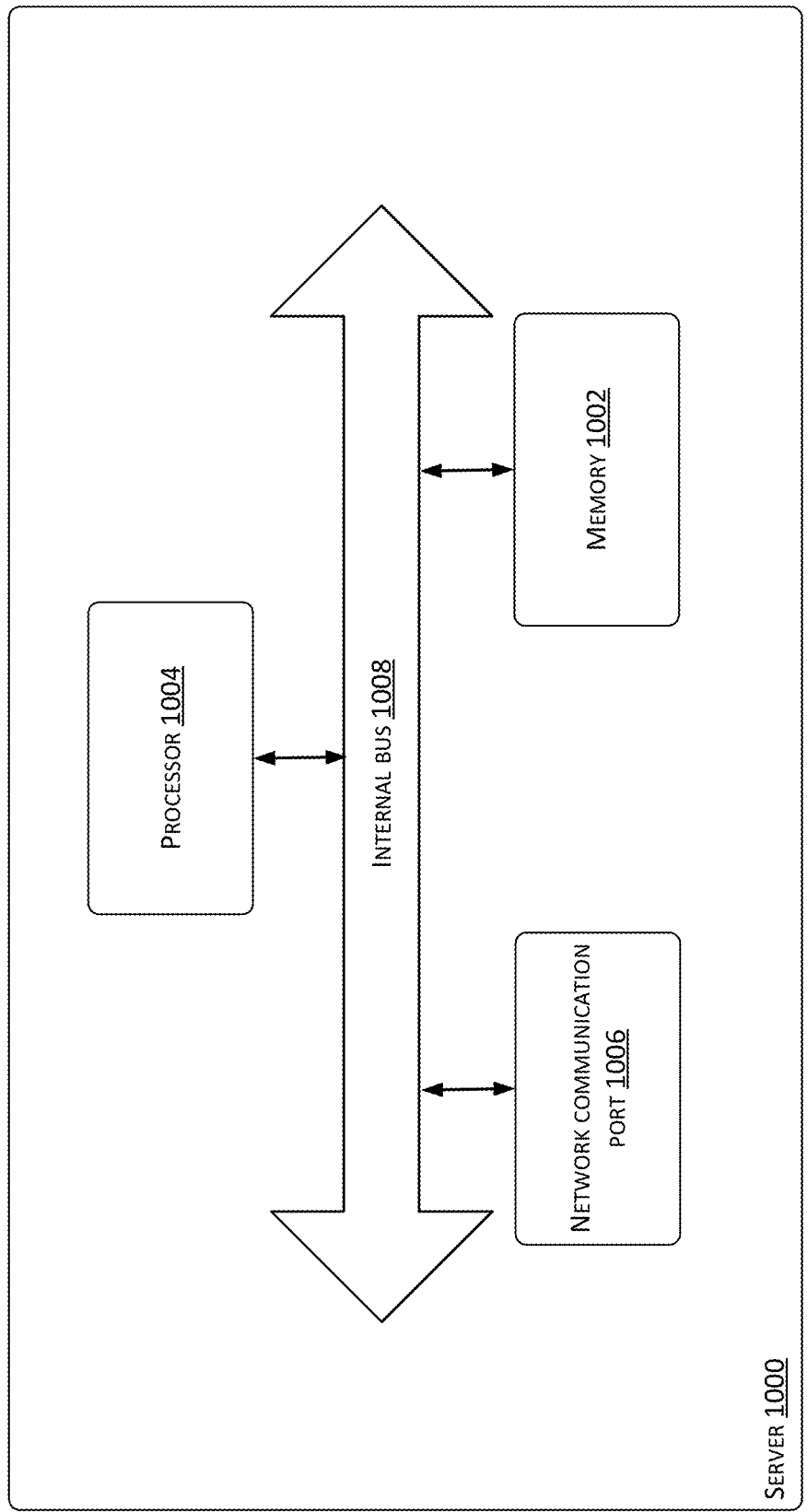
FIG. 10 is a schematic structural diagram of a server according to the embodiments of the present disclosure.

Referring to FIG. 10, the present disclosure further provides a server 1000. The server 1000 includes a memory 1002, a processor 1004, a network communication port 1006, and an internal bus 1008.

The network communication port 1006 is configured to perform network data communication.

The memory 1002 is configured to provide map data of a target city and store a computer program executable by the processor.

The processor 1004 is configured to implement the following operations when the computer program is executed:

providing at least one divided dimension, each divided dimension corresponding to at least one sub-dimension; determining a regional scope corresponding to at least one sub-dimension of the divided dimension on a map of a target city according to different divided dimensions; and determining an association relationship between service objects and the sub-dimension according to a location relationship between geographical relationship information of the service objects and the regional scope, the sub-dimension being used for displaying information of the service objects associated with the sub-dimension after the sub-dimension is provided to a client through the network communication port and clicked.

In implementations, the network communication port 1006 may be virtual ports that are bound to different communication protocols so that different data can be transmitted or received. For example, the network communication port may be a port 80 responsible for conducting web data communications, a port 21 responsible for conducting FTP data communications, or a port 25 responsible for conducting mail data communications. Furthermore, the network communication port can also be a physical communication interface or a communication chip. For example, the network communication port may be a wireless mobile network communication chip, such as GSM, CDMA, etc., a Wifi chip, or a Bluetooth chip.

In implementations, the memory 1002 may be a memory device used for storing information. In a digital system, a device capable of storing binary data may be a memory. In an integrated circuit, a circuit having a memory function without a physical form may also be a memory, for example, a RAM, a FIFO, etc. In a system, a storage device having a physical form may also be called a memory, such as a memory stick, a TF card, or the like. In implementations, the memory 1002 may include a form of computer readable media as described in the foregoing description.

The processor 1004 can be implemented in any suitable manner. For example, a processor can employ, for example, a microprocessor or processor, and a form of computer readable media, logic gates, switches, application-specific integrated circuits (such as software or firmware), programmable logic controllers, and embedded microcontrollers etc., that store computer readable program codes executable by the (micro)processor. The present disclosure does not have any limitation thereon.

Specific functions implemented by the network communication port 1006, the memory 1002, and the processor 1004 of the server disclosed in the foregoing embodiments may be referenced with the embodiments of the method for processing map data in the present disclosure. The specific functions are able to implement the embodiments of the method for processing the map data in the present disclosure, and achieve the technical effects of the method embodiments.

The embodiments of the present disclosure further provide a method for displaying a service object, and the method includes the following operations.

A client, displays a filtering interface, the filtering interface including a map and a divided dimension display area, wherein the map is divided into a plurality of regional scopes, the divided dimension display area includes at least one divided dimension and a plurality of corresponding sub-dimensions, the sub-dimensions corresponding to one of the plurality of regional scopes in the map; each of the sub-dimensions points to a service object set, and a geographical location of a service object in each service object set is located in a regional scope corresponding to a respective sub-dimension.

In implementations, after a user inputs a preliminary filtering condition, the client may provide a service object list page to the user. The preliminary filtering condition may be a city to stay, a check-in period, etc. For example, the user enters a city as Beijing, and check-in period to be from September 23 to September 24 in the client. In this way, the client can provide a service object list page to the user. Each search item can be ordered in the service object list page according to factors such as distance, score, price, and the like. A plurality of filtering controls may also be included in the service object list page. The filtering controls may include, for example, recommended ranking, star rating, hotel location, and the like. In implementations, the filtering interface may be invoked when a filtering control is clicked. For example, when the hotel location is clicked, a filtering interface, such as the one as shown in FIGS. 3 and 4, can be displayed in the client.

Referring to FIG. 3 and FIG. 4, in implementations, a map and a divided dimension display area may be included in the filtering interface. A user can interact with the map. Specifically, the user can adjust a display position and a display size of the map through common gestures such as clicking, dragging, and two-finger swiping.

In implementations, the filtering interface may further include a divided dimension display area. The divided dimension display area can be used for displaying entries for various geographical regions of the target city. Specifically, at least one divided dimension may be included in the divided dimension display area. The divided dimension may include, for example, administrative regions, subway lines, points of attraction, business districts, hospitals, universities, etc. More specific sub-dimensions can be included in each divided dimension. For example, specific points of attraction such as Tiananmen Square, the Forbidden City, and the Beijing Zoo, etc., may be included in the points of attraction.

In implementations, each divided dimension and corresponding sub-dimensions can be displayed through description information. The description information may include name information of a divided dimension and name information of a sub-dimension. The name information of the divided dimension may be used for representing types of the sub-dimensions. For example, the name information of the divided dimension may be a school, a hospital, a business district, etc. The name information of the sub-dimension can be used for representing a geographical location of the sub-dimension. For example, the name information of the sub-dimension may be Tiananmen, Badaling, the Forbidden City, etc.

In implementations, each sub-dimension may point to a service object set. Service objects included in the service object set may also be different for different applications. For example, if an application in a current client can implement a function of hotel reservation, the service object set may then include information of each hotel. For another example, if the application in the current client can implement a function of cinema search, the service object set may then include information of each cinema. Therefore, in implementations, the service object set may be a set of service objects having geographical location information. In this way, each service object in the service object set pointed to by the sub-dimension can have an association relationship with the sub-dimension.

In implementations, each service object set may include service object(s) located in a geographical region identified by at least one sub-dimension. For example, if a sub-dimension is "Tiananmen", then a geographical region identified by such sub-dimension may be an area within 5 kilometers of Tiananmen. In this case, service objects located in a geographical region identified by this sub-dimension can be a hotel, a KTV, a movie theater, a bank, etc. that are located within 5 kilometers of Tiananmen.

In implementations, at least one regional scope used for identifying a geographical region may be displayed in the map. The regional scope in the map may correspond to a sub-dimension in the divided dimension display area. Specifically, if a sub-dimension in the divided dimension display area is Tiananmen, the map may also have a regional scope of Tiananmen, and the regional scope corresponds to the sub-dimension of Tiananmen. This type of correspondence relationship is reflected by the ability of synchronously selecting or synchronously unselecting the sub-dimension and the regional scope corresponding to the sub-dimension in the map.

Specifically, in implementations, the regional scope may refer to a control that is displayed on a map and is capable of interacting with a user. In implementations, the regional scope can be used for identifying a geographical region on the map. Identifying the geographical region by the regional scope may include a shape of the regional scope being adapted to a scope of the geographical region or the regional scope being located at the geographical region. Specifically, a geographical region usually has a certain scope of coverage when appearing as a regional location on a map. At this time, a regional scope identifying the geographical region may be expressed as a polygon, and a shape of this polygon may be conformed to a shape of the regional location. For example, a divided dimension of administrative region may include regional locations such as Dongzhimen, Qianmen, and Drum Tower, etc. In this case, areas identifying these administrative regions can be polygons that can approximately cover corresponding administrative regions. In addition, when a geographical region appears as a point location on a map, a regional scope identifying such geographical region may also be represented as a point. As such, the regional scope may be located at the corresponding geographical region. For example, in a divided dimension of point of attraction, points of attraction such as Tiananmen, the Forbidden City, and Beijing Zoo, although points of attraction such as Tiananmen, the Forbidden City, and Beijing Zoo actually occupy certain areas, sizes of these points of attraction can be appeared as point locations on the map as compared with administrative regions. Therefore, areas identifying these points of attraction may be dot-shaped regional scopes having a relatively small area. These dot-shaped regional scopes may be located at corresponding points of attraction.

It should be noted that, during practical applications, since a map can be scaled according to an interactive gesture of a user, a coverage area of each geographical region is different under different scaling ratios. As such, when a location of a point of attraction as described above is enlarged, a coverage area occupied thereby may occupy a large area of the map display area. In this case, a scope of a dot-shaped area that is originally used to identify the point of attraction may be converted into a block-shaped regional scope. Similarly, a size of such block-shaped regional scope can be matched to an area of the enlarged point of attraction. Similarly, when the map in the map display area is reduced, the original block-shaped regional scope can also be converted into a dot-shaped regional scope accordingly.

In implementations, the map and the divided dimension display area may be included in a same page. Sizes and positions of the map and the divided dimension display area may be configured in advance in this page. For example, the map may be located above the divided dimension display area. The number of sub-dimensions initially displayed in the divided dimension display area and the number of new additions per refresh may also be configured in advance. For example, the initial number of sub-dimensions displayed in the divided dimension display area may be five, and the number of new sub-dimensions may be five. In this way, when the filtering interface is initially displayed, five sub-dimensions can be displayed in the divided dimension display area. Referring to FIG. 5, the user can load more sub-dimensions into the divided dimension display area by dragging the filtering interface upwards or downwards. Apparently, other ways of loading sub-dimensions into the divided dimension display area can also exist. For example, referring to FIG. 6, written characters of "Load More" can be displayed at the bottom of the divided dimension display area. Subsequent sub-dimensions can be displayed after the user clicks on the written characters. Therefore, the present disclosure does not have any limitations on the way of loading more sub-dimensions into the divided dimension display area. After more sub-dimensions are loaded, the user can browse through these additional sub-dimensions by sliding down the filtering interface.

As the number of loaded sub-dimensions increases, the map may gradually disappear from the current page when the user browses the filtering interface downwards. This may be disadvantageous for the user to determine an actual position of a sub-dimension in the map. Accordingly, in another embodiment of the present disclosure, the map and the divided dimension display area may also be located in different pages. The map can always be displayed in a fixed position in a display of the client, and upward or downward navigation of sub-dimensions in the divided dimension display area can be performed by sliding the page. The position of the map can always be the same while the divided dimension display area is being slid. In this way, no matter how the user slides the divided dimension display area, the map can always be seen on the display of the client, thus helping the user to view an actual position of each sub-dimension in the map.

In implementations, a regional scope in the map and a sub-dimension in the divided dimension display area may have an association relationship. Specifically, a regional scope and a sub-dimension that identify a same geographical region can be associated with each other. For example, in the map, a regional scope identifying the Dongzhimen administrative region may be associated with a sub-dimension that includes a written character of Dongzhimen in the divided dimension display area. A regional scope and a sub-dimension that are associated can be selected synchronously or unselected synchronously.

In implementations, a regional scope in the map may be in one-to-one correspondence with a sub-dimension in the divided dimension display area. For example, if the divided dimension display area includes 5 sub-dimensions, only 5 regional scopes corresponding thereto can be displayed in the map. When more sub-dimensions are loaded into the divided dimension display area, only regional scopes corresponding to these newly loaded sub-dimensions may be displayed in the map. Alternatively, regional scopes corresponding to all sub-dimensions that have been loaded may also be displayed. Alternatively, after the number of regional scopes displayed currently reaches a preset limited value, the regional scopes that are displayed currently are cleared, and regional scopes corresponding to newly loaded sub-dimensions are displayed.

In an embodiment of the present disclosure, in order to be able to clearly distinguish which regional scopes are selected and which regional scopes are not selected, at least two background colors may be associated for each regional scope. In implementations, regional scope information selected by the user in the map display area may be received. The regional scope information can define regional scopes that are selected and regional scopes that are not selected by the user. Specifically, when a preset regional scope is selected, the preset regional scope may be presented with a first background color. When the preset regional scope is not selected, the preset regional scope may be presented with a second background color. The first background color and the second background color are different. For example, a regional scope may be blue in color in the map display area when not being selected. Once selected, the regional scope may be shown in red color. In this way, when the user selects a sub-dimension containing a text description, a corresponding regional scope can be shown in red color, and the user can know where a geographical region corresponding to the currently selected sub-dimensions is located in the city.

In an embodiment of the present disclosure, different display forms of regional scopes may be determined for different geographical regions according to areas occupied by the geographical regions in the map display area. For example, for a geographical region in an administrative region, an area thereof in the map display area is typically large. Therefore, for this type of geographical region, a block-shaped regional scope can be utilized. A contour of the block-shaped regional scope can be consistent with a contour of the geographical region. For a geographical region in a point of attraction, an area occupied thereby in the map display area is usually small. Therefore, for this type of geographical region, a dot-shaped regional scope can be utilized. A dot-shaped regional scope can be located at a location of a corresponding point of attraction. For different types of geographical regions, distinctions can be made using different divided dimensions. The divided dimensions may include, for example, administrative regions, points of attraction, hospitals, universities, and the like. In this case, a display form of a regional scope can be associated with a current divided dimension.

In implementations, an operational instruction of a user for switching from a first divided dimension to a second divided dimension may be received. In this way, in response to the operational instruction, a regional scope in the map display area may be switched from a first display form to a second display form. The first display form is associated with the first divided dimension, and a second display form is associated with the second divided dimension. For example, when switching from a filtering condition associated with administrative region to a filtering condition associated with point of attraction, a regional scope in the map display area can be switched from a block shape to a dot shape.

In an embodiment of the present disclosure, the number of regional scopes to be displayed in the map display area may be very large. If all are displayed, it will be very messy, and the user is not easy to make a selection accurately. Therefore, in implementations, when the number of regional scopes to be displayed in the map display area is greater than a preset threshold, the regional scopes to be displayed may be divided into at least two regional scope subsets. The number of regional scopes included in each of the regional scope subsets is less than or equal to the preset threshold. In implementations, the preset threshold may be the maximum number of regional scopes that are simultaneously displayed in the map display area. When the number of regional scopes to be displayed is greater than this maximum number, the regional scopes can be displayed in individual batches. Regional scopes of each batch can be located in a regional scope subset. In order to enable displaying each regional scope in a regional scope subset at one time, when regional scope subsets are demarcated, the number of regional scopes included in each regional scope subset may be set to be less than or equal to the maximum number of regional scopes that is defined by the map display area for display at one time.

In implementations, when regional scopes to be displayed are divided into at least two regional scope subsets, regional scopes in each regional scope subset may be displayed one by one in the map display area. Specifically, regional scopes of one of the regional scope subsets may be displayed in the map display area, and regional scopes of another regional scope subset is displayed after receiving a content refresh instruction issued by a user.

In implementations, a way of refreshing content in the map display area may include performing a refresh by refreshing a sub-dimension in the divided dimension display area or directly performing a refresh according to a refresh button in the map display area. Specifically, the user loads more sub-dimensions by pulling up or sliding down the divided dimension display area, or clicking written characters of "Load More" at the bottom of the divided dimension display area. For example, sub-dimensions of five points of attraction are displayed in the current divided dimension display area, and similarly, corresponding five regional scopes are also displayed in the map display area. After the divided dimension display area is pulled down, sub-dimensions of five remaining points of attraction may continue to be loaded into the divided dimension display area, and the five initial regional scopes may be cleared from the map display area. Only regional scopes corresponding to the five recently loaded points of attraction are displayed. Furthermore, in implementations, a refresh button may be set in advance in the map display area. If regional scopes of five points of attraction are currently displayed in the map display area, the regional scopes of the five points of attraction can be cleared from the map display area when the user clicks the refresh button, and regional scopes of five other points of attraction are displayed. It should be noted that refreshed content needs to be synchronized in both a map display area and a divided dimension display area whether a refresh is performed through the divided dimension display area or a refresh is performed through the map display area. For example, by clicking a refresh button in the map display area, regional scopes of five other points of attraction are displayed. In this case, sub-dimensions corresponding to these five points of attraction are automatically loaded into the divided dimension display area.

In implementations, the regional scopes to be displayed may be ordered according to different geographical regions. Specifically, ordering can be performed based on respective popularities of the geographical regions, respective numbers of visits by visitors, respective ranking levels of points of attraction, etc. In this way, regional scopes and sub-dimensions of each batch can be sequentially displayed in the map display area and the divided dimension display area according to an ordering result. Apparently, during practical applications, a certain number of regional scopes and sub-dimensions may be randomly displayed after each refresh, which is not limited in the present disclosure.

In an embodiment of the present disclosure, the client may further receive a target sub-dimension selected by the user, and display a search result page for that target sub-dimension. The search result page includes at least one service object, where each service object includes a service object identifier and comment information that is adapted to the target sub-dimension.

In implementations, in order to facilitate the user to intuitively know the details of each service object, comment information adapted to the target sub-dimension may be added to each service object.

In implementations, the comment information is adapted to the target sub-dimension, which may mean that a sub-dimension selected by the user who edits the comment information is the same as the target sub-dimension. For example, a current user has the "Summer Palace" as a target sub-dimension. After clicking a search button, a search result page displays various hotels near the Summer Palace, where each hotel entry can contain at least one piece of comment information. These pieces of comment information can be edited by previous users after their stays. Sub-dimensions selected by these users who edited these pieces of comment information on their clients are also a sub-dimension of Summer Palace. In this way, directly providing the current user with comment information of other users having the same itinerary in the search result page can assist the current user to quickly select a search result, thereby avoiding the current user from the need of clicking search results one by one, and checking the statuses of pieces of comment information in details page of the search results one by one.

Figure 11:
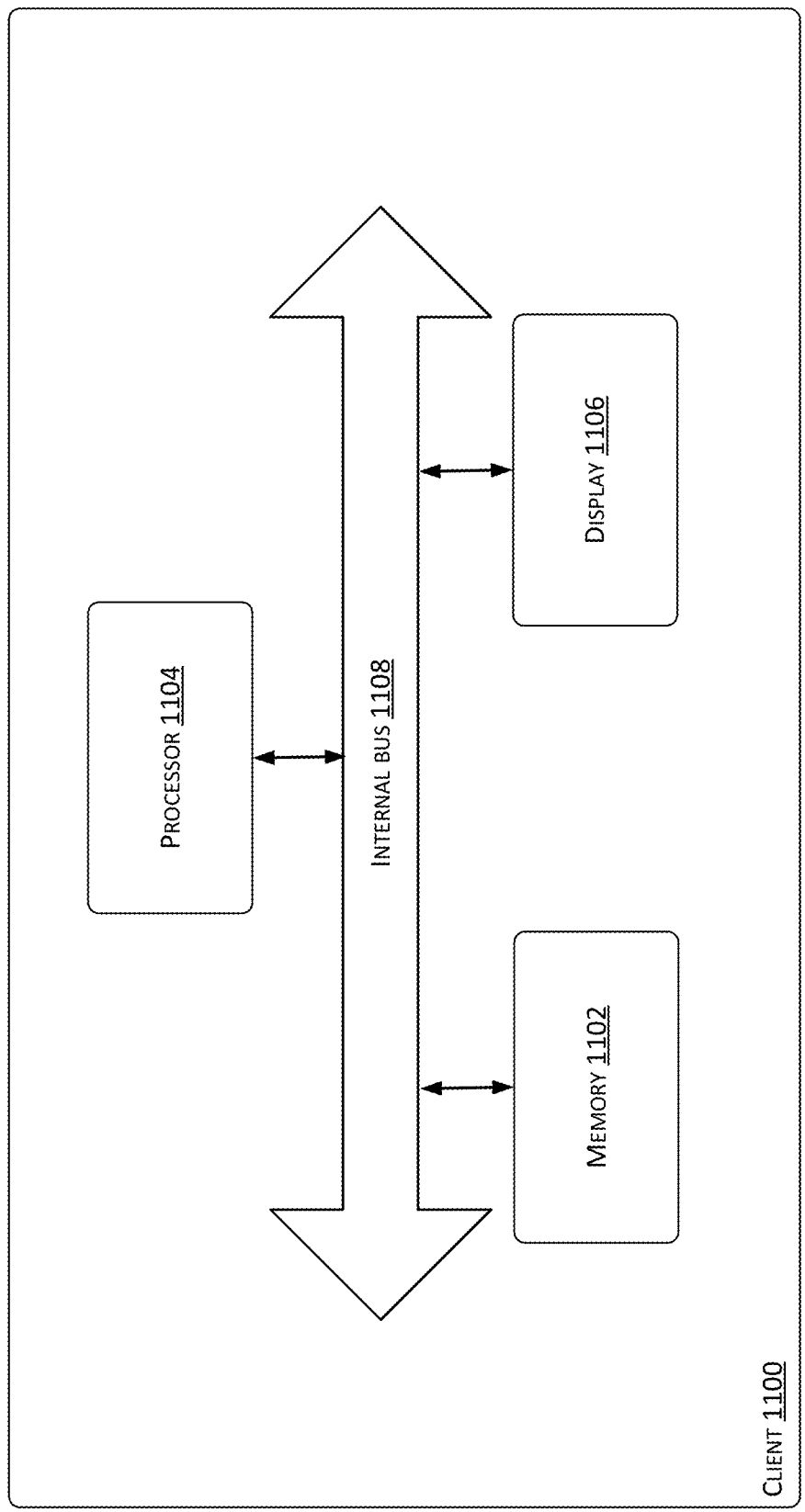
FIG. 11 is a schematic structural diagram of a client according to the embodiments of the present disclosure.

Referring to FIG. 11, the embodiments of the present disclosure further provide a client 1100. The client 1100 includes a memory 1102, a processor 1104, a display 1106, and an internal bus 1108.

The display 1106 is configured to display page information.

The memory 1102 is configured to store a computer program executable by the processor.

The processor 1104 is configured to implement the following operations when the computer program is executed:

displaying a filtering interface through the display, the filtering interface including a map and a divided dimension display area, wherein the map is divided into a plurality of regional scopes, the divided dimension display area includes at least one divided dimension and a plurality of corresponding sub-dimensions, the sub-dimensions corresponding to one of the plurality of regional scopes in the map; each of the sub-dimensions points to a service object set, and a geographical location of a service object in each service object set is located in a regional scope corresponding to a respective sub-dimension.

In implementations, the memory 1102 may be a memory device used for storing information. In a digital system, a device capable of storing binary data may be a memory. In an integrated circuit, a circuit having a memory function without a physical form may also be a memory, for example, a RAM, a FIFO, etc. In a system, a storage device having a physical form may also be called a memory, such as a memory stick, a TF card, or the like. In implementations, the memory 1102 may include a form of computer readable media as described in the foregoing description.

In implementations, the display 1106 may be a display tool that displays a certain electronic file to a screen through a specific transmission device and then reflects it to the human eye. The display may include a liquid crystal LCD display, a cathode ray tube CRT display, a light emitting diode LED display, etc.

In implementations, the processor 1104 can be implemented in any suitable manner. For example, a processor can employ, for example, a microprocessor or processor, and a form of computer readable media, logic gates, switches, application-specific integrated circuits (such as software or firmware), programmable logic controllers, and embedded microcontrollers etc., that store computer readable program codes executable by the (micro)processor. The present disclosure does not have any limitation thereon.

Specific functions implemented by the memory 1102, the processor 1104, and the display 1106 of the client disclosed in the foregoing embodiments may be referenced with the embodiments of the method for displaying a service object in the present disclosure, and are able to implement the embodiments of the method for displaying the service object in the present disclosure as well as achieve the technical effects of the method embodiments.

On the one hand, the methods for displaying service objects and processing map data, the client, and the server provided by the embodiments of the present disclosure can simultaneously provide a map display area and a divided dimension display area to a user so that the user can set filtering condition(s) by selecting a regional scope in the map display area, or by selecting sub-dimension(s) in the dimension display area. During a process of selection, the user where a selected geographical region is located in a city without the need of performing additional location query operations. On the other hand, in the embodiments of the present disclosure, when a search result page is provided to the user, respective comment information adapted to the filtering condition(s) of the user may be added to each search option. In this way, the user can intuitively know comments of travelers who have trips that are similar to that of the user for each search result, thereby enabling the user to make a quick decision without having to click each search result one by one to query comment information of each user.

In the 1990s, improvements to a technology can clearly be distinguished as hardware improvements (e.g., improvements in circuit structures such as diodes, transistors, switches, etc.) or software improvements (for improvements in method processes). However, along with an advancement of the technology, many recent improvements in the method processes can be seen as direct improvements in hardware circuit structures. Designers can almost always obtain a corresponding hardware circuit structure by programming an improved method process into a hardware circuit. Therefore, it cannot be said that an improvement in a method process cannot be implemented by hardware entity module(s). For example, a programmable logic device (PLD) (such as a field programmable gate array (FPGA)) is an integrated circuit which logic functions are determined through programming the device by a user. A designer writes a program himself/herself to "integrate" a digital system on a single PLD without requiring a chip manufacturer to design and manufacture a dedicated integrated circuit chip 2. Moreover, today, to replace a manual production of an integrated circuit chip, this type of programming is mostly implemented using "logic compiler" software, which is similar to a software compiler used in developing and writing a program. Original coded before compiling also need to be written in a specific programming language, which is called a hardware description language (HDL). HDL includes not just one type, but includes a plurality of types, for example, ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc. Currently, the most commonly used one is VHDL (Very-High-Speed Integrated Circuit Hardware Description Language) and Verilog2. One skilled in the art should be clear that a hardware circuit for implementing a logic method process can easily be obtained simply by logic programming of the method flow into an integrated circuit using a few hardware description languages as described above.

As can be seen from the above description of the embodiments, one skilled in the art can clearly understand that that the present disclosure can be implemented by means of software plus a necessary general hardware platform. Based on such understanding, the essence of the technical solutions of the present disclosure or portions that make contributions to the existing technologies can be embodied in a form of a software product. Such computer software product may be stored in a storage medium such as a ROM/RAM, a magnetic disk, an optical disk, etc., and includes instructions for causing a computing device (which may be a personal computer, a server, or a network device, etc.) to perform the methods described in various embodiments of the present disclosure or portions of the embodiments.

The various embodiments in the present specification are described in a progressive manner, and the same or similar parts between the various embodiments may be referenced to each other. Each embodiment focuses on aspects that are different from those of other embodiments. In particular, for the implementations of the client and server, reference can be made to the aforementioned description of the implementations of the methods.

The present disclosure can be used in a variety of general purpose or special purpose computer system environments or configurations, for example, a personal computer, a server computer, a handheld or portable device, a tablet device, a multiprocessor system, a microprocessor based system, a set-top box, a programmable consumer electronic device, a network PC, a small computer, a mainframe computer, a distributed computing environment including any of the above systems or devices, etc.

The present disclosure can be described in the general context of computer-executable instructions executed by a computer, such as a program module. Generally, a program module include a routine, a program, an object, a component, a data structure, etc., that performs a particular task or implements a particular abstract data type. The present disclosure can also be practiced in distributed computing environments. In these distributed computing environments, a task is performed by remote processing devices that are connected through a communication network. In a distributed computing environment, program modules can be located in both local and remote computer storage media including storage devices.

Although the present disclosure is described using the embodiments, one of ordinary skill in the art understands that the present disclosure has a number of modifications and changes without departing the spirit of the present disclosure. These modifications and changes are intended to be included in the appended claims without departing the spirit of the present disclosure.

The present disclosure can further be understood using the following clauses.

Clause 1: A method for displaying a service object, wherein a database is provided, the database stores an association relationship between service objects and at least one sub-dimension of different divided dimensions, and the method comprises: providing a filtering interface, wherein the filtering interface comprises a map display area and a dimension-divided display area, the dimension-divided display area displays at least one divided dimension and description information corresponding to a plurality of sub-dimensions, wherein a map of a target city is displayed in the map display area, and the map of the target city displays regional scopes corresponding to the plurality of sub-dimensions; receiving information of a divided dimension and a sub-dimension selected by a user; and displaying a service object associated with the sub-dimension selected by the user according to the association relationship between the service objects and the sub-dimension.

Clause 2: The method according to Clause 1, wherein the method further comprises: providing a service object list page, wherein the service object list page comprises a filtering control; and calling a filtering interface when the filtering control is clicked.

Clause 3: The method according to Clause 1, wherein the sub-dimension and a regional scope corresponding to the sub-dimension in the map display area are synchronously selected or synchronously unselected.

Clause 4: The method according to Clause 1, wherein the regional scopes and the plurality of sub-dimensions comprise respective location identifiers, wherein a regional scope and a sub-dimension identifying a same geographical region have a same location identifier.

Clause 5: The method according to Clause 1, wherein the regional scopes are associated with at least two background colors, and correspondingly, the method further comprises: receiving regional scope information selected by the user in the map display area; presenting a preset regional scope in a first background color when the preset regional scope is selected; and presenting the preset regional scope in a second background color when the preset regional scope is not selected.

Clause 6: The method according to Clause 1, wherein a display form of a regional scope is associated with a current divided dimension, and correspondingly, the method further comprises: receiving an operational instruction for switching from a first divided dimension to a second divided dimension from the user; and switching a regional scope in the map display area from a first display form to a second display form according to the operational instruction.

Clause 7: The method according to Clause 1, wherein: when a number of regional scopes to be displayed in the map display area is greater than a preset threshold, the method further comprises: dividing regional scopes to be displayed into at least two regional scope subsets, a number of the regional scopes included in each of the regional scope subsets being less than or equal to a preset threshold; and displaying regional scopes of one of the regional scope subsets in the map display area, and displaying regional scopes of another regional scope subset after receiving a content refresh instruction issued by the user.

Clause 8: The method according to Clause 1, wherein each sub-dimension comprises a filtering identifier and remark information, the remark information comprising a selection frequency parameter of the filtering identifier and/or a search result parameter corresponding to the filtering identifier.

Clause 9: The method according to Clause 8, wherein sub-dimensions in the divided dimension display area are sorted according to the selection frequency parameter.

Clause 10: The method according to Clause 1, wherein the method further comprises: receiving a target sub-dimension selected by the user, and displaying a search result page for the target sub-dimension, the search result page comprising at least one service object, wherein each service object comprises a service object identifier and comment information adapted to the target sub-dimension.

Clause 11: The method according to Clause 10, wherein the comment information comprises a comment label and a number of comments corresponding to the comment label.

Clause 12: The method according to Clause 11, wherein when an amount of comment information to be displayed in the service object is greater than a preset threshold, the method further comprises: ordering each piece of comment information based on respective numbers of comments in the comment information; and extracting an amount of target comment information from the ordered pieces of comment information corresponding to the preset threshold, and displaying the target comment information in the service object.

Clause 13: The method according to Clause 10, wherein the service object further comprises a ratio between a number of users who publish the comment information and a total number of users who use the service object.

Clause 14: The method according to Clause 1, wherein the description information comprises name information of the divided dimension and name information of the sub-dimension, wherein the name information of the divided dimension is used for representing a type of the sub-dimension, the name information of the sub-dimension is used for representing a geographical location of the sub-dimension.

Clause 15: A client, wherein the client comprises a memory, a processor, and a display, wherein: the memory is configured to provide a database and store a computer program executable by the processor, wherein the database stores an association relationship between service objects and at least one sub-dimension of different divided dimensions; the display is configured to display page information; and the processor is configured to implement, when the computer program is executed, the following operations: providing a filtering interface, wherein the filtering interface comprises a map display area and a dimension-divided display area, the dimension-divided display area displays at least one divided dimension and description information corresponding to a plurality of sub-dimensions, a map of a target city is displayed in the map display area, and the map of the target city displays regional scopes corresponding to the plurality of sub-dimensions; receiving information of a divided dimension and a sub-dimension selected by a user; and displaying a service object associated with the sub-dimension selected by the user according to an association relationship between the service object and the sub-dimension.

Clause 16: A method for processing map data, wherein map data of a target city is provided, and the method comprises: providing at least one divided dimension, each divided dimension corresponding to at least one sub-dimension; determining a regional scope corresponding to the at least one sub-dimension of the divided dimension on the map of the target city according to different divided dimensions; and determining an association relationship between a service object and the sub-dimension according to a location relationship between geographical relationship information of the service object and the regional scope, the sub-dimension being used for displaying information of the service object associated with the sub-dimension after the sub-dimension is provided to a client and clicked.

Clause 17: The method according to Clause 16, wherein the divided dimension comprises a business district, the sub-dimension is a name of the business district, and correspondingly, determining the regional scope corresponding to the at least one sub-dimension of the divided dimension on the map of the target city specifically comprises: determining a regional scope corresponding to a name of at least one business district on the map of the target city according to the business district.

Clause 18: The method according to Clause 17, wherein determining the association relationship between the service object and the sub-dimension comprises: determining a service object which geographical location is located within the business district as the service object associated with the sub-dimension.

Clause 19: The method of Clause 16, wherein the divided dimension comprises a point of attraction, the sub-dimension is a name of the point of attraction, and correspondingly, determining the regional scope corresponding to the at least one sub-dimension of the divided dimension on the map of the target city specifically comprises: determining a location of at least one point of attraction on the map of the target city according to the point of attraction.

Clause 20: The method according to Clause 19, wherein determining the association relationship between the service object and the sub-dimension comprises: determining a service object whose distance between having a geographical location that is within a preset range from a location of the point of attraction as the service object associated with the sub-dimension.

Clause 21: A server comprising: a memory, a processor, and a network communication port, wherein: the network communication port is configured to perform network data communications; the memory is configured to provide map data of a target city and store a computer program executable by the processor; and The processor is configured to implement, when the computer program is executed, the following operations: providing at least one divided dimension, each divided dimension corresponding to at least one sub-dimension; determining a regional scope corresponding to at least one sub-dimension of the divided dimension on the map of the target city according to different divided dimensions; and determining an association relationship between a service object and the sub-dimension according to a location relationship between geographical relationship information of the service object and the regional scope, the sub-dimension being used for displaying information of the service object associated with the sub-dimension after the sub-dimension is provided to a client through the network communication port and clicked.

Clause 22: A method for displaying a service object, the method comprising: displaying, by a client, a filtering interface, the filtering interface including a map and a divided dimension display area, wherein the map is divided into a plurality of regional scopes, the divided dimension display area includes at least one divided dimension and a plurality of corresponding sub-dimensions, the sub-dimensions corresponding to one of the plurality of regional scopes in the map; each of the sub-dimensions points to a service object set, and a geographical location of a service object in each service object set is located in a regional scope corresponding to a respective sub-dimension.

Clause 23: The method according to Clause 22, wherein the method further comprises: providing, by the client, a service object list page, wherein the service object list page comprises a filtering control; and displaying, by the client, the filtering interface when the filtering control is clicked.

Clause 24: The method according to Clause 22, wherein the regional scopes are associated with at least two background colors, and correspondingly, the method further comprises: receiving regional scope information selected by the user in the map; displaying a preset regional scope in a first background color when the preset regional scope is selected; and displaying the preset regional scope in a second background color when the preset regional scope is not selected.

Clause 25: The method according to Clause 22, wherein a display form of the regional scope is associated with a current divided dimension; accordingly, the method further comprises: receiving an operational instruction for switching from a first divided dimension to a second divided dimension from the user; and switching the regional scope in the map from a first display form to a second display form according to the operational instruction.

Clause 26: The method according to Clause 22, wherein: when the number of regional scopes to be displayed in the map is greater than a preset threshold, the method further comprises: dividing regional scopes to be displayed into at least two regional scope subsets, a number of the regional scopes included in each of the regional scope subsets being less than or equal to a preset threshold; and displaying regional scopes of one of the regional scope subsets in the map, and displaying regional scopes of another regional scope subset after receiving a content refresh instruction issued by the user.

Clause 27: The method of Clause 22, wherein the method further comprises: receiving, by the client, a target sub-dimension selected by the user, and displaying a search result page for the target sub-dimension, the search result page comprising at least one service object, wherein each service object comprises a service object identifier and comment information adapted to the target sub-dimension.

Clause 28: A client, wherein the client comprises a memory, a processor, and a display, wherein: the display is configured to display page information; the memory is configured to store a computer program executable by the processor; and the processor is configured to implement, when the computer program is executed, the following operations: displaying a filtering interface through the display, the filtering interface including a map and a divided dimension display area, wherein the map is divided into a plurality of regional scopes, the divided dimension display area includes at least one divided dimension and a plurality of corresponding sub-dimensions, the sub-dimensions corresponding to one of the plurality of regional scopes in the map; each of the sub-dimensions points to a service object set, and a geographical location of a service object in each service object set is located in a regional scope corresponding to a respective sub-dimension.

What is claimed is:

1. A method implemented by one or more computing devices, the method comprising:
   providing a filtering interface, wherein the filtering interface comprises a map display area and a dimension-divided display area, the dimension-divided display area displays at least one divided dimension and description information corresponding to a plurality of sub-dimensions, wherein a map of a target city is displayed in the map display area, and the map of the target city displays regional scopes corresponding to the plurality of sub-dimensions;
   receiving information of a divided dimension and a sub-dimension selected by a user; and
   displaying a service object associated with the sub-dimension selected by the user according to an association relationship between the service object and the sub-dimension.

2. The method according to claim 1, wherein the method further comprises:
   providing a service object list page, wherein the service object list page comprises a filtering control; and
   calling a filtering interface when the filtering control is selected.

3. The method according to claim 1, wherein the sub-dimension and a regional scope corresponding to the sub-dimension in the map display area are synchronously selected or synchronously unselected.

4. The method according to claim 1, wherein the regional scopes and the plurality of sub-dimensions comprise respective location identifiers, wherein a regional scope and a sub-dimension identifying a same geographical region have a same location identifier.

5. The method according to claim 1, wherein the regional scopes are associated with at least two background colors, and the method further comprises:
   receiving regional scope information selected by the user in the map display area;
   presenting a preset regional scope in a first background color when the preset regional scope is selected; and
   presenting the preset regional scope in a second background color when the preset regional scope is not selected.

6. The method according to claim 1, wherein a display form of a regional scope is associated with a current divided dimension, and the method further comprises:
   receiving an operational instruction for switching from a first divided dimension to a second divided dimension from the user; and
   switching a regional scope in the map display area from a first display form to a second display form according to the operational instruction.

7. The method according to claim 1, wherein: when a number of regional scopes to be displayed in the map display area is greater than a preset threshold, the method further comprises:
   dividing regional scopes to be displayed into at least two regional scope subsets, a number of the regional scopes included in each of the regional scope subsets being less than or equal to a preset threshold; and
   displaying regional scopes of one of the regional scope subsets in the map display area, and displaying regional scopes of another regional scope subset after receiving a content refresh instruction issued by the user.

8. The method according to claim 1, wherein each sub-dimension comprises a filtering identifier and remark information, the remark information comprising a selection frequency parameter of the filtering identifier and/or a search result parameter corresponding to the filtering identifier.

9. The method according to claim 8, wherein sub-dimensions in the divided dimension display area are sorted according to the selection frequency parameter.

10. The method according to claim 1, further comprising:
    receiving a target sub-dimension selected by the user, and displaying a search result page for the target sub-dimension, the search result page comprising at least one service object, wherein each service object comprises a service object identifier and comment information adapted to the target sub-dimension.

11. The method according to claim 10, wherein the comment information comprises a comment label and a number of comments corresponding to the comment label.

12. The method according to claim 11, wherein: when an amount of comment information to be displayed in the service object is greater than a preset threshold, the method further comprises:
    ordering each piece of comment information based on respective numbers of comments in the comment information; and
    extracting an amount of target comment information from the ordered pieces of comment information corresponding to the preset threshold, and displaying the target comment information in the service object.

13. The method according to claim 10, wherein the service object further comprises a ratio between a number of users who publish the comment information and a total number of users who use the service object.

14. The method according to claim 1, wherein the description information comprises name information of the divided dimension and name information of the sub-dimension, wherein the name information of the divided dimension is used for representing a type of the sub-dimension, the name information of the sub-dimension is used for representing a geographical location of the sub-dimension.

15. A client comprising:
one or more processors;
memory; and
a display, wherein:
the memory configured to provide a database and store a computer program executable by the one or more processors, wherein the database stores an association relationship between service objects and at least one sub-dimension of different divided dimensions;
the display is configured to display page information; and
the one or more processors are configured to execute the computer program to implement acts comprising:
providing a filtering interface, wherein the filtering interface comprises a map display area and a dimension-divided display area, the dimension-divided display area displays at least one divided dimension and description information corresponding to a plurality of sub-dimensions, a map of a target city is displayed in the map display area, and the map of the target city displays regional scopes corresponding to the plurality of sub-dimensions; receiving information of a divided dimension and a sub-dimension selected by a user; and displaying a service object associated with the sub-dimension selected by the user according to an association relationship between the service object and the sub-dimension.

16. One or more computer readable media storing executable instructions that, when executed by one or more processors, cause the one or more processors to perform acts comprising:
providing at least one divided dimension, each divided dimension corresponding to at least one sub-dimension;
determining a regional scope corresponding to the at least one sub-dimension of the divided dimension on a map of a target city according to different divided dimensions; and
determining an association relationship between a service object and the sub-dimension according to a location relationship between geographical relationship information of the service object and the regional scope, the sub-dimension being used for displaying information of the service object associated with the sub-dimension after the sub-dimension is provided to a client and selected.

17. The one or more computer readable media according to claim 16, wherein the divided dimension comprises a business district, the sub-dimension is a name of the business district, and correspondingly, determining the regional scope corresponding to the at least one sub-dimension of the divided dimension on the map of the target city comprises:
determining a regional scope corresponding to a name of at least one business district on the map of the target city according to the business district.

18. The one or more computer readable media according to claim 17, wherein determining the association relationship between the service object and the sub-dimension comprises:
determining a service object which geographical location is located within the business district as the service object associated with the sub-dimension.

19. The one or more computer readable media of claim 16, wherein the divided dimension comprises a point of attraction, the sub-dimension is a name of the point of attraction, and correspondingly, determining the regional scope corresponding to the at least one sub-dimension of the divided dimension on the map of the target city comprises:
determining a location of at least one point of attraction on the map of the target city according to the point of attraction.

20. The one or more computer readable media according to claim 19, wherein determining the association relationship between the service object and the sub-dimension comprises:
determining a service object whose distance between having a geographical location that is within a preset range from a location of the point of attraction as the service object associated with the sub-dimension.

* * * * *